(12) United States Patent
Casalaina et al.

(10) Patent No.: US 8,718,241 B2
(45) Date of Patent: May 6, 2014

(54) METHODS AND APPARATUS FOR INTERFACING WITH A PHONE SYSTEM IN AN ON-DEMAND SERVICE ENVIRONMENT

(75) Inventors: Marco Casalaina, San Francisco, CA (US); Gautam Vasudev, San Francisco, CA (US); Rahul Kaw, Pleasanton, CA (US); Rachel Wang, Foster City, CA (US); Jason A. Ellis, Geneva, IL (US)

(73) Assignee: salesforce.com, inc., San Francisco, CA (US)

( * ) Notice: Subject to any disclaimer, the term of this patent is extended or adjusted under 35 U.S.C. 154(b) by 715 days.

(21) Appl. No.: 12/878,283

(22) Filed: Sep. 9, 2010

(65) Prior Publication Data

US 2011/0274258 A1    Nov. 10, 2011

Related U.S. Application Data

(60) Provisional application No. 61/346,592, filed on May 20, 2010, provisional application No. 61/332,659, filed on May 7, 2010.

(51) Int. Cl.
*H04M 1/64*    (2006.01)
*H04M 11/00*   (2006.01)

(52) U.S. Cl.
USPC .................................. 379/88.17; 379/93.01

(58) Field of Classification Search
USPC ....................... 379/88.11, 88.19, 88.17, 93.01
See application file for complete search history.

(56) References Cited

U.S. PATENT DOCUMENTS

| 5,577,188 | A |   | 11/1996 | Zhu |
| 5,608,872 | A |   | 3/1997 | Schwartz et al. |
| 5,649,104 | A |   | 7/1997 | Carleton et al. |
| 5,715,450 | A |   | 2/1998 | Ambrose et al. |
| 5,754,636 | A | * | 5/1998 | Bayless et al. ............. 379/142.1 |
| 5,761,419 | A |   | 6/1998 | Schwartz et al. |
| 5,819,038 | A |   | 10/1998 | Carleton et al. |
| 5,821,937 | A |   | 10/1998 | Tonelli et al. |
| 5,831,610 | A |   | 11/1998 | Tonelli et al. |
| 5,873,096 | A |   | 2/1999 | Lim et al. |
| 5,918,159 | A |   | 6/1999 | Fomukong et al. |

(Continued)

OTHER PUBLICATIONS

U.S. Office Action dated Mar. 29, 2013 issued in U.S. Appl. No. 12/878,288.

(Continued)

*Primary Examiner* — Joseph T Phan
(74) *Attorney, Agent, or Firm* — Weaver Austin Villeneuve & Sampson LLP

(57) ABSTRACT

Disclosed are systems, apparatus, methods, and computer readable media for interfacing with a phone system in an on-demand service environment. In one embodiment, a client machine is in communication with a data provider and the phone system. The phone system is operated by a phone provider separate from the data provider. A message is received at the client machine from the phone system. The message includes information regarding a phone event in relation to a phone call. The phone event information is provided in a first part of a user interface in a web browser on the client machine. A second part of the user interface is capable of displaying information received at the client machine from the data provider. The first part of the user interface and the second part of the user interface are adapted to communicate with one another. For example, the first part of the user interface is adapted to send a message including the phone event information to the second part of the user interface.

33 Claims, 11 Drawing Sheets

(56) References Cited

U.S. PATENT DOCUMENTS

| | | | |
|---|---|---|---|
| 5,923,736 A | * | 7/1999 | Shachar ............... 379/93.17 |
| 5,946,386 A | * | 8/1999 | Rogers et al. ......... 379/265.09 |
| 5,963,953 A | | 10/1999 | Cram et al. |
| 5,983,227 A | | 11/1999 | Nazem et al. |
| 6,031,836 A | * | 2/2000 | Haserodt ............... 370/389 |
| 6,092,083 A | | 7/2000 | Brodersen et al. |
| 6,169,534 B1 | | 1/2001 | Raffel et al. |
| 6,178,425 B1 | | 1/2001 | Brodersen et al. |
| 6,189,011 B1 | | 2/2001 | Lim et al. |
| 6,216,133 B1 | | 4/2001 | Masthoff |
| 6,216,135 B1 | | 4/2001 | Brodersen et al. |
| 6,233,617 B1 | | 5/2001 | Rothwein et al. |
| 6,236,978 B1 | | 5/2001 | Tuzhilin |
| 6,266,669 B1 | | 7/2001 | Brodersen et al. |
| 6,288,717 B1 | | 9/2001 | Dunkle |
| 6,295,530 B1 | | 9/2001 | Ritchie et al. |
| 6,324,568 B1 | | 11/2001 | Diec et al. |
| 6,324,693 B1 | | 11/2001 | Brodersen et al. |
| 6,336,137 B1 | | 1/2002 | Lee et al. |
| D454,139 S | | 3/2002 | Feldcamp et al. |
| 6,367,077 B1 | | 4/2002 | Brodersen et al. |
| 6,393,605 B1 | | 5/2002 | Loomans |
| 6,404,860 B1 | * | 6/2002 | Casellini ............... 379/88.17 |
| 6,405,220 B1 | | 6/2002 | Brodersen et al. |
| 6,411,949 B1 | | 6/2002 | Schaffer |
| 6,434,550 B1 | | 8/2002 | Warner et al. |
| 6,445,694 B1 | * | 9/2002 | Swartz ............... 370/352 |
| 6,446,089 B1 | | 9/2002 | Brodersen et al. |
| 6,535,909 B1 | | 3/2003 | Rust |
| 6,549,908 B1 | | 4/2003 | Loomans |
| 6,553,563 B2 | | 4/2003 | Ambrose et al. |
| 6,560,461 B1 | | 5/2003 | Fomukong et al. |
| 6,574,635 B2 | | 6/2003 | Stauber et al. |
| 6,577,726 B1 | | 6/2003 | Huang et al. |
| 6,601,087 B1 | | 7/2003 | Zhu et al. |
| 6,604,117 B2 | | 8/2003 | Lim et al. |
| 6,604,128 B2 | | 8/2003 | Diec et al. |
| 6,609,150 B2 | | 8/2003 | Lee et al. |
| 6,621,834 B1 | | 9/2003 | Scherpbier et al. |
| 6,654,032 B1 | | 11/2003 | Zhu et al. |
| 6,665,648 B2 | | 12/2003 | Brodersen et al. |
| 6,665,655 B1 | | 12/2003 | Warner et al. |
| 6,684,438 B2 | | 2/2004 | Brodersen et al. |
| 6,711,565 B1 | | 3/2004 | Subramaniam et al. |
| 6,724,399 B1 | | 4/2004 | Katchour et al. |
| 6,728,702 B1 | | 4/2004 | Subramaniam et al. |
| 6,728,960 B1 | | 4/2004 | Loomans et al. |
| 6,732,095 B1 | | 5/2004 | Warshavsky et al. |
| 6,732,100 B1 | | 5/2004 | Brodersen et al. |
| 6,732,111 B2 | | 5/2004 | Brodersen et al. |
| 6,754,681 B2 | | 6/2004 | Brodersen et al. |
| 6,763,351 B1 | | 7/2004 | Subramaniam et al. |
| 6,763,501 B1 | | 7/2004 | Zhu et al. |
| 6,768,904 B2 | | 7/2004 | Kim |
| 6,782,383 B2 | | 8/2004 | Subramaniam et al. |
| 6,804,330 B1 | | 10/2004 | Jones et al. |
| 6,826,565 B2 | | 11/2004 | Ritchie et al. |
| 6,826,582 B1 | | 11/2004 | Chatterjee et al. |
| 6,826,745 B2 | | 11/2004 | Coker |
| 6,829,655 B1 | | 12/2004 | Huang et al. |
| 6,842,748 B1 | | 1/2005 | Warner et al. |
| 6,850,895 B2 | | 2/2005 | Brodersen et al. |
| 6,850,949 B2 | | 2/2005 | Warner et al. |
| 6,907,566 B1 | | 6/2005 | McElfresh et al. |
| 6,950,503 B2 | | 9/2005 | Schwartz et al. |
| 7,062,502 B1 | | 6/2006 | Kesler |
| 7,100,111 B2 | | 8/2006 | McElfresh et al. |
| 7,213,073 B1 | * | 5/2007 | Slavin ............... 709/230 |
| 7,269,590 B2 | | 9/2007 | Hull et al. |
| 7,313,228 B1 | | 12/2007 | Sorice et al. |
| 7,340,411 B2 | | 3/2008 | Cook |
| 7,373,599 B2 | | 5/2008 | McElfresh et al. |
| 7,401,094 B1 | | 7/2008 | Kesler |
| 7,406,501 B2 | | 7/2008 | Szeto et al. |
| 7,454,509 B2 | | 11/2008 | Boulter et al. |
| 7,477,907 B2 | | 1/2009 | Koch et al. |
| 7,599,935 B2 | | 10/2009 | La Rotonda et al. |
| 7,603,331 B2 | | 10/2009 | Tuzhilin et al. |
| 7,620,655 B2 | | 11/2009 | Larsson et al. |
| 7,644,122 B2 | | 1/2010 | Weyer et al. |
| 7,668,861 B2 | | 2/2010 | Steven |
| 7,698,160 B2 | | 4/2010 | Beaven et al. |
| 7,730,478 B2 | | 6/2010 | Weissman |
| 7,747,648 B1 | | 6/2010 | Kraft et al. |
| 7,779,039 B2 | | 8/2010 | Weissman et al. |
| 7,827,208 B2 | | 11/2010 | Bosworth et al. |
| 7,853,881 B1 | | 12/2010 | Assal et al. |
| 7,945,653 B2 | | 5/2011 | Zukerberg et al. |
| 8,005,896 B2 | | 8/2011 | Cheah |
| 8,073,850 B1 | | 12/2011 | Hubbard et al. |
| 8,082,301 B2 | | 12/2011 | Ahlgren et al. |
| 8,095,413 B1 | | 1/2012 | Beaven |
| 8,095,531 B2 | | 1/2012 | Weissman et al. |
| 8,095,594 B2 | | 1/2012 | Beaven et al. |
| 8,103,611 B2 | | 1/2012 | Tuzhilin et al. |
| 8,150,913 B2 | | 4/2012 | Cheah |
| 8,165,277 B2 | * | 4/2012 | Chen et al. ............... 379/201.12 |
| 8,209,333 B2 | | 6/2012 | Hubbard et al. |
| 8,275,836 B2 | | 9/2012 | Beaven et al. |
| 8,341,535 B2 | * | 12/2012 | Lyman ............... 715/753 |
| 2001/0044791 A1 | | 11/2001 | Richter et al. |
| 2002/0072951 A1 | | 6/2002 | Lee et al. |
| 2002/0082892 A1 | | 6/2002 | Raffel |
| 2002/0129352 A1 | | 9/2002 | Brodersen et al. |
| 2002/0140731 A1 | | 10/2002 | Subramaniam et al. |
| 2002/0143997 A1 | | 10/2002 | Huang et al. |
| 2002/0162090 A1 | | 10/2002 | Parnell et al. |
| 2002/0165742 A1 | | 11/2002 | Robbins |
| 2003/0004971 A1 | | 1/2003 | Gong |
| 2003/0018705 A1 | | 1/2003 | Chen et al. |
| 2003/0018830 A1 | | 1/2003 | Chen et al. |
| 2003/0066031 A1 | | 4/2003 | Laane et al. |
| 2003/0066032 A1 | | 4/2003 | Ramachandran et al. |
| 2003/0069936 A1 | | 4/2003 | Warner et al. |
| 2003/0070000 A1 | | 4/2003 | Coker et al. |
| 2003/0070004 A1 | | 4/2003 | Mukundan et al. |
| 2003/0070005 A1 | | 4/2003 | Mukundan et al. |
| 2003/0074418 A1 | | 4/2003 | Coker et al. |
| 2003/0120675 A1 | | 6/2003 | Stauber et al. |
| 2003/0151633 A1 | | 8/2003 | George et al. |
| 2003/0159136 A1 | | 8/2003 | Huang et al. |
| 2003/0187921 A1 | | 10/2003 | Diec et al. |
| 2003/0189600 A1 | | 10/2003 | Gune et al. |
| 2003/0204427 A1 | | 10/2003 | Gune et al. |
| 2003/0206192 A1 | | 11/2003 | Chen et al. |
| 2003/0225730 A1 | | 12/2003 | Warner et al. |
| 2004/0001092 A1 | | 1/2004 | Rothwein et al. |
| 2004/0010489 A1 | | 1/2004 | Rio et al. |
| 2004/0015981 A1 | | 1/2004 | Coker et al. |
| 2004/0027388 A1 | | 2/2004 | Berg et al. |
| 2004/0128001 A1 | | 7/2004 | Levin et al. |
| 2004/0186860 A1 | | 9/2004 | Lee et al. |
| 2004/0193510 A1 | | 9/2004 | Catahan et al. |
| 2004/0199489 A1 | | 10/2004 | Barnes-Leon et al. |
| 2004/0199536 A1 | | 10/2004 | Barnes-Leon et al. |
| 2004/0199543 A1 | | 10/2004 | Braud et al. |
| 2004/0249854 A1 | | 12/2004 | Barnes-Leon et al. |
| 2004/0260534 A1 | | 12/2004 | Pak et al. |
| 2004/0260659 A1 | | 12/2004 | Chan et al. |
| 2004/0268299 A1 | | 12/2004 | Lei et al. |
| 2005/0050555 A1 | | 3/2005 | Exley et al. |
| 2005/0091098 A1 | | 4/2005 | Brodersen et al. |
| 2009/0063415 A1 | | 3/2009 | Chatfield et al. |
| 2011/0274261 A1 | | 11/2011 | Casalaina et al. |
| 2012/0290407 A1 | | 11/2012 | Hubbard et al. |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

FIG. 5

METHODS AND APPARATUS FOR INTERFACING WITH A PHONE SYSTEM IN AN ON-DEMAND SERVICE ENVIRONMENT

PRIORITY AND RELATED APPLICATION DATA

This application claims priority to co-pending and commonly assigned U.S. Provisional Patent Application Nos. 61/346,592, titled METHOD AND SYSTEM FOR IMPLEMENTING A SOFTPHONE IN A MULTITENANT DATABASE ENVIRONMENT, by Casalaina, et al., filed on May 20, 2010, and 61/332,659, titled METHOD AND SYSTEM FOR INTEGRATING A TELEPHONY SYSTEM IN A MULTITENANT SYSTEM ENVIRONMENT, by Casalaina, et al., filed on May 7, 2010, both of which are hereby incorporated by reference in their entirety and for all purposes.

TECHNICAL FIELD

The present application relates generally to on-demand services provided over a data network such as the Internet and, more specifically, to techniques for interfacing data provider systems with phone provider systems in the on-demand services network.

BACKGROUND

Organizations typically employ many different types of software and computing technologies to meet their computing needs. However, installing and maintaining software on an organization's own computer systems can have its drawbacks. For example, when software must be installed on computer systems within larger organizations, the installation process often requires significant time commitments, since organization personnel may need to separately access each computer. Once installed, the maintenance of such software typically requires significant additional resources. Each installation of the software may need to be separately monitored and upgraded. Further, organization personnel may need to protect each installed piece of software against viruses and other malevolent code. Given the difficulties in updating and maintaining software installed on many different computer systems, it is common for organizations to let software to become outdated. Also, the organization will likely need to ensure that the various software programs installed on each computer system are compatible. Compatibility problems are compounded by frequent upgrading, which may result in different versions of the same software being used at different computer systems in the same organization.

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process operations for the disclosed inventive systems, apparatus, and methods for interfacing with phone systems and related services. These drawings in no way limit any changes in form and detail that may be made by one skilled in the art without departing from the spirit and scope of the disclosed embodiments.

FIG. 5 shows a GUI 500 generated on a display device of a client machine in an on-demand service environment, in accordance with one or more embodiments.

DETAILED DESCRIPTION

Figure 1:
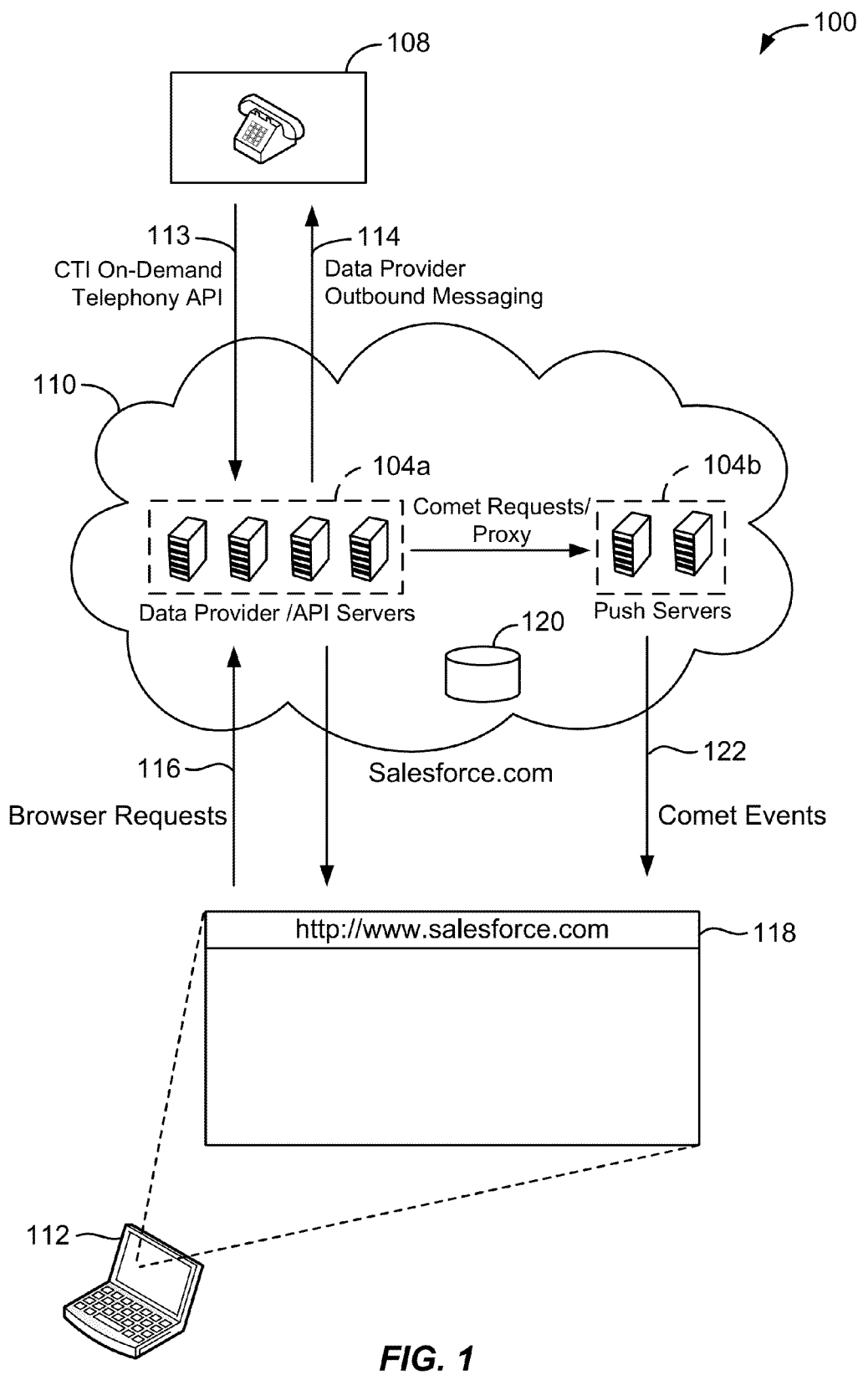
FIG. 1 shows a system 100 for interfacing with a phone system in an on-demand service environment, in accordance with one embodiment.

Examples of systems, apparatus, and methods according to the disclosed embodiments are described in this section. These examples are being provided solely to add context and aid in the understanding of the disclosed embodiments. It will thus be apparent to one skilled in the art that implementations may be practiced without some or all of these specific details. In other instances, well known process steps have not been described in detail in order to avoid unnecessarily obscuring embodiments. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosed implementations, it is understood that these examples are not limiting, such that other embodiments may be used and changes may be made without departing from their spirit and scope.

Various embodiments described or referenced herein are directed to different methods, apparatus, systems, and computer program products for facilitating interfaces with phone systems in an on-demand service environment. In some embodiments, the disclosed methods, apparatus, systems, and computer program products may be configured or designed for use in a multi-tenant database environment.

The disclosed embodiments generally relate to an on-demand push-based architecture for integrating with telephony systems in a data network. In these embodiments, a phone call delivered and handled by a phone provider, such as Cisco, Nortel, Avaya, etc., on a phone system can be monitored and controlled by computers in a cloud computing environment. In such embodiments, the desired monitoring and control can be achieved without having to install local software on client machines in the environment. In some embodiments, methods and systems are disclosed for handling phone-related events from and sending commands to a phone system, while also interacting with a data provider, such as salesforce.com®, for searches via its web services. The disclosed methods, apparatus, and systems are configured to render interfaces or parts of interfaces in web browser processes running on client machines in the cloud, again without requiring the use of local client applications.

These and other embodiments may be implemented by various types of hardware, software, firmware, etc. For example, some embodiments may be implemented, at least in part, by machine-readable media that include program instructions, state information, etc., for performing various services and operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM"). These and other features and benefits of the disclosed embodiments will be described in more detail below with reference to the associated drawings.

FIG. 1 shows a system 100 for interfacing with a phone system in an on-demand service environment, in accordance with one embodiment. The system 100 includes one or more application programming interface (API) servers 104*a* and one or more "push" servers 104*b*. A data provider, such as salesforce.com®, operates the API servers 104*a*. In some embodiments, the push servers 104*b* are also operated by or on behalf of the same data provider. Thus, a single organization, such as salesforce.com®, can simultaneously provide the services of both sets of servers 104*a* and 104*b*, as described in greater detail below. The various servers 104*a* and 104*b* can be parts of a multi-tenant server configuration in an on-demand service environment, as further described below.

In one embodiment, the servers 104*a* and 104*b* cooperate to function as a proxy server. Thus, in this embodiment, "proxy server" is intended to refer collectively to one or more of the API servers 104*a* in combination with one or more of the servers 104*b*. As described herein, the proxy server generally provides services to relay phone event information between a phone system 108 and a client machine 112, such as a computer operated at a customer call center. In some implementations, phone system 108 is local with respect to an organization at which the client machine is located, while in other embodiments, phone system 108 is at a remote geographic location.

In another embodiment, the proxy server is implemented only as one or more of the push servers 104*b*, while the API servers 104*a*, operated by or otherwise associated with the data provider, are configured to retrieve and deliver data from the multi-tenant system managed by the data provider to client machines separate from the phone-related data delivered by push servers 104*b* between client machine 112 and phone system 108. In another alternative embodiment, illustrated in FIG. 2, the servers 104*a* and 104*b* are integrated into a single proxy server 104 operated by the data provider. For instance, the single server 104 could be configured to perform communications with both phone system 108 and client machine 112.

In the various configurations described above, it can be desirable in some implementations to have the one or more servers 104*a* and 104*b* sharing the same network domain, such as www.salesforce.com. For instance, a user of client machine 112 can have a single account at salesforce.com®. By logging into this single account, the user can access the various services provided by both API server(s) 104*a* and push server(s) 104*b*, in FIG. 1. Such an implementation is convenient and desirable both for the users of the client machines and the data provider controlling the one or more servers 104*a* and 104*b*.

In FIG. 1, in one embodiment, one or more of the API servers 104*a* are in communication with client machine 112, and one or more of the push servers 104*b* are also in communication with client machine 112. The same can be true for multiple additional client machines in the network. In this way, for example, data stored in a multi-tenant database system can be delivered to the client by servers 104*a*, while phone-related data can be delivered to the client by servers 104*b*. Thus, client machine 112 can be running a web browser program 118 which receives information separately from one or more data provider servers 104*a* and one or more servers 104*b*.

In FIG. 1, the servers 104*a* and 104*b* are connected as part of a data network 110, which can be defined according to the desired implementation. For example, data network 110 can be the Internet. In another example, data network 110 comprises one or more local area networks (LAN) in communication with one or more wide area networks (WAN) such as the Internet. Additional possible configurations of data network 110 are described below.

Embodiments described herein are often implemented in a cloud computing environment, in which the data network 110, servers 104*a* and 104*b*, and possible additional apparatus and systems such as multi-tenant databases and even phone system 108 are all considered part of the "cloud," as further explained below with reference to FIGS. 7A and 7B. The client machines themselves can also be considered part of the cloud. In such implementations, a user operating a client machine can be unaware of the back-end server configuration and communications with phone system 108. From the user's perspective, data is simply requested from the "cloud," in this embodiment, data network 110, and appropriate data can be delivered by the data provider. Thus, in FIG. 1, the servers 104*a* and 104*b* are illustrated as part of the cloud 110.

In FIG. 1, the phone system 108 provides phone calls, as described in greater detail below, and is operated by a phone provider. The data provider/API servers 104*a* are in communication with phone system 108 via an appropriate API. For instance, in FIG. 1, a computer telephony integration (CTI) API 113 allows phone system 108 to communicate with data provider servers 104*a*. Via the API 113, phone system 108 is capable of communicating phone events occurring in a phone call and related information to API servers 104*a*.

The API servers 104*a* are configured to communicate with phone system 108 using outbound messaging 114. The phone system 108 connecting to the API servers 104*a* should therefore be capable of receiving outbound messages from the particular data provider, such as salesforce.com®. For instance, an endpoint Uniform Resource Locator (URL) at phone system 108 can be adapted to receive SOAP messages. On the server side, salesforce.com® server(s) 104*a* is configured to send outbound messages to the phone system 108 to process. Phone system 108 can call the CTI API 113 to send inbound information. For instance, when API 113 is invoked by phone system 108, phone event information can be passed to API servers 104*a*, relayed from servers 104*a* to push servers 104*b*, and then passed to browser program 118 as one or more Comet events.

In some embodiments, the data provider and the phone provider are different entities. Such can be desirable, for example, when the data provider is operating a multi-tenant database in an on-demand service environment to provide application-related data to clients in the network, but is not in the business of delivering phone calls, that is, the actual audio communications and content of a telephone conversation. In such embodiments, the data provider interfaces with the phone provider via system 108, for instance, to communicate phone-related event data to clients via the cloud, but the phone provider otherwise manages the phone calls using conventional telephone lines and equipment.

In FIG. 1, clients such as client machine 112 are in communication with the proxy server, in this embodiment, comprising both API servers 104*a* and push servers 104*b*. In this way, a client 112 can communicate with the data provider via the data network 110. The client machine has appropriate input devices, such as a keyboard, a mouse, a camera, a microphone, and other peripherals connected to receive inputs from operators of the client machine. The input devices can be hard-wired and in a local location with respect to the client machine, or they can be wireless and thus be local or carried to remote locations with respect to the client machine.

In FIG. 1, one or more of the data provider servers 104*a* are configured to receive and process request messages 116 from browser programs 118 running on clients, such as client machine 112. In the present embodiment, the data provider/API servers 104*a* are configured to respond to such requests 116 by sending requested data back to a client 112, for instance, after retrieving the requested data from database system 120 in the multi-tenant system. In the embodiment of FIG. 1, the data provider/API servers 104*a* can be configured to relay all or certain designated request messages to push servers 104*b*, which are configured to push appropriate information back to the web browser 118 running on client 112. The information delivered to the browser 118 can be displayed in an appropriate part of a user interface provided in the browser 118, as described in greater detail below. In some embodiments, one or more of the data provider servers, such as push servers 104*b*, are in communication with the web browser 118 via a persistent connection, such as Comet. In such embodiments, the push servers 104*b* are capable of sending information to web browser 118 as Comet events 122.

As used herein, phone events generally refer to events occurring in relation to a phone call. These include actions a phone can take and events occurring in response to those actions. For instance, the phone event may be an incoming telephone call or an outgoing telephone call. Further phone events include the initiation or termination of a call and associated events such as a phone ringing, the call connecting, and a call being dropped. The phone event may include various events that occur during a call, such as placing the call on hold, transferring the call, a teleconference with multiple participants, etc. The phone event may also refer to an input, e.g., key-based, voice-based, etc., from the caller as further discussed below.

Figure 2:
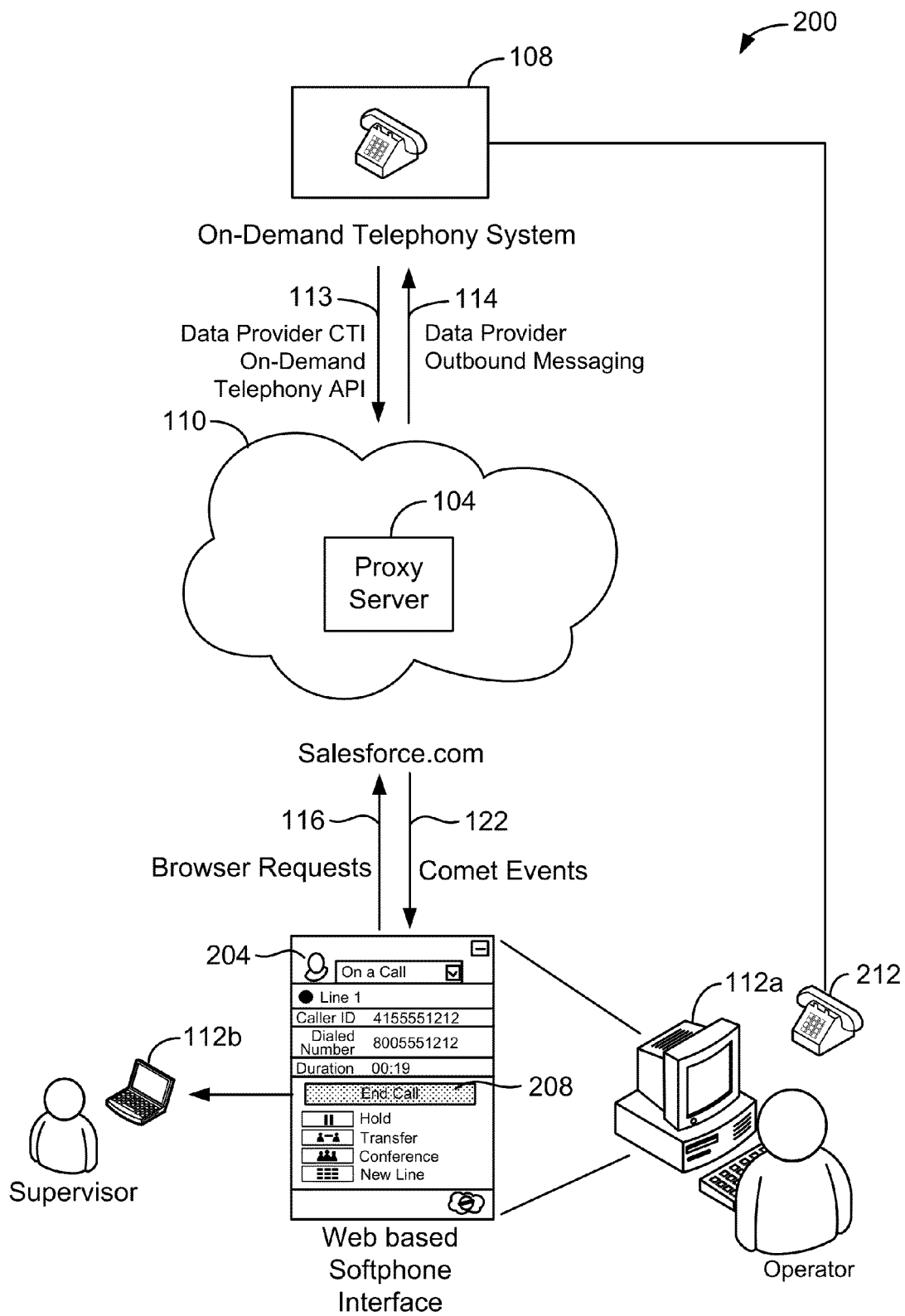
FIG. 2 shows a system 200 for interfacing with a phone system in an on-demand service environment, in accordance with another embodiment.

FIG. 2 shows a system 200 for interfacing with a phone system in an on-demand service environment, in accordance with another embodiment. The system 200 has some of the same apparatus, networks, and interfaces described above with respect to FIG. 1. Common elements are indicated by common reference numerals. In FIG. 2, the various data provider servers 104*a* and 104*b* are integrated into a single proxy server 104, as described above.

In FIG. 2, when phone event information is delivered from proxy server 104 to client computer 112*a*, for instance, as a Comet event, a "softphone" interface 204 is generated as a part of a user interface displayed in a web browser program on a display device of the client computer 112*a*. The softphone state can be represented as XML, for example, presented to the user via XSLT transformation. The displayed data in softphone interface 204 can include phone event information such as the status of the call being answered and active. In some implementations, the softphone interface is also configured to display related phone event information, such as caller ID, the dialed number, and the duration of the call. Such information can also be relayed by proxy server 104 in near real-time as the information is received by proxy server 104 from phone system 108.

In one implementation, phone providers through phone system 108 interact with on-demand salesforce.com® server (s), such as API servers 104*a*, using API 113, as described above with reference to FIG. 1. Phone events occurring in relation to a phone call are received by the phone system and the corresponding CTI API is called. This translates into a corresponding state of softphone interface 204. The state can be parsed by salesforce.com® and the phone event information, including softphone state, is sent to the client's browser. The push servers 104*b* send the information to the user's browser. This information is processed at client machines, for example, using a client-side Comet event handling library. Such a library will then update the softphone interface 204 based on the corresponding API call.

In FIG. 2, in some implementations, the computer code generating the softphone interface is also configured to display graphical buttons as user selections, such as "End Call" button 208 in interface 204. When the user clicks on such a button 208, the selection of "End Call" is communicated as an action, a particular type of phone event, back to proxy server 104, which can then relay the action back to phone system 108. The phone system 108 can then handle the phone call delivered to the operator at a telephone 212 appropriately. As with the embodiment of FIG. 1, in FIG. 2, the phone call itself is delivered by phone system 108 to the telephone 212, and the phone provider thus carries out the phone events. The proxy server 104 provides a gateway for the web-based softphone interface 204, so an operator at a client machine can view phone event information regarding the phone call in a displayed user interface, and can use the interface to relay phone events back to the phone system 108 via the proxy server 104. Telephone 212 can be implemented as a conventional "hard" telephone or as a softphone, for instance, on the client computer 112*a*.

In FIGS. 1 and 2, in some embodiments, responsive to user interactions with the softphone interface 204, or when salesforce.com® otherwise sends messages to the phone provider, Salesforce® proprietary outbound messaging is used. In the case of a user interaction, the browser request 116 is sent from client computer 112 to one or more of the data provider servers 104*a*. The action is then relayed back to the phone system 108 via the outbound messaging 114. In some instances, in which the phone provider specifies acknowledgement ("ACK") for API calls or responses that do not require user interaction or browser communication, ACK messages can be sent from data provider servers 104*a* to phone system 108 directly via outbound messaging 114.

In FIG. 2, in one implementation in a call center environment, one or more call center agents operate client machines, such as computer 112*a*, and a supervisor is the user of supervisor's computer 112*b*. For instance, supervisor computer 112*b* can be coupled as part of a LAN and be provided with access permission levels and capabilities to monitor operator activity on other client machines such as computer 112*a*. Thus, in this embodiment, the supervisor computer 112*b* is coupled to receive the same phone event information received by computer 112*a*, and display the information in a user interface in a web browser running on the computer 112*b*. The supervisor's computer is also coupled to receive user-generated messages, such as phone events, entered by the user on computer 112*a*.

Figure 3:
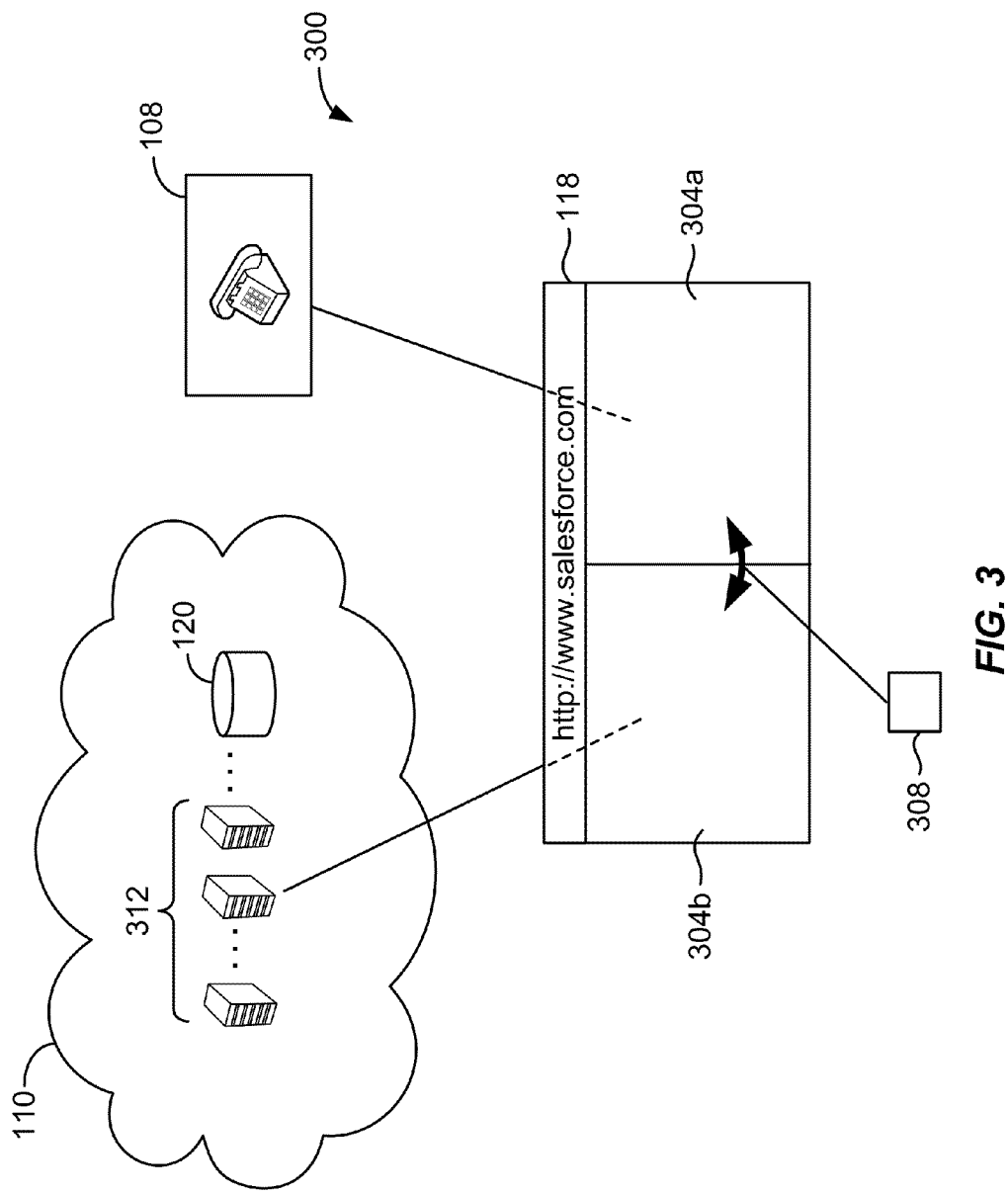
FIG. 3 shows a system 300 for interfacing with a phone system in an on-demand service environment, in accordance with another embodiment.

FIG. 3 shows a system 300 for interfacing with a phone system in an on-demand service environment, in accordance with an alternative embodiment. The system 300 is different from systems 100 and 200, in that there is no proxy server in system 300 acting as an intermediary between the phone system 108 and the web browser 118 running on the client machine. In FIG. 3, data provider server(s) 312 communicate directly with web browser program 118 over a first communications path in the cloud, and the phone system 108 communicates directly with web browser program 118 over a suitable second communications path.

In one implementation of FIG. 3, the phone provider is granted a JavaScript toolkit describing appropriate CTI components. The phone system 108 can thus be provided with an API allowing it to communicate phone event information to the browser program 118. Thus, a softphone interface 204, for instance, can be immediately updated by phone system 108 to reflect the current state of a phone call.

In the embodiment of FIG. 3, phone event information received at the web browser 118 from phone system 108 can be displayed in a phone part of a user interface 304*a* on a display device of the client machine. A data provider part of the user interface 304*b* displays information received from the data provider servers 312.

In FIG. 3, within the web browser program, the phone part of the user interface 304*a* and the data provider part of the user interface 304*b* are adapted to communicate with one another. Thus, the phone part 304*a* is capable of passing information to the data provider part 304*b*, and vice versa. For example, the phone part 304*a* can send a message including phone event information received directly from phone system 108 to the data provider part 304*b*. The data provider part 304*b* is capable of processing the message and, for example, displaying the phone event information as part of a softphone interface 204, which can be a further part of the user interface displayed in the web browser program 118.

In FIG. 3, the phone part 304*a* and the data provider part 304*b* of the user interface communicate with one another via a suitable API 308, such as a cross-domain API, described in greater detail below. Thus, the phone system 108 and the data provider server(s) 312 can have different network domains. In alternative embodiments, other cross-domain communication techniques can be used, as described below. In one implementation, a JavaScript library is configured to call a JavaScript API to provide the desired messaging. The phone part 304*a*, data provider part 304*b*, and further parts of the user interface displayed in browser program 118 can be configured to subscribe to messages from one another using the appropriate API to provide the desired communications.

In FIG. 3, when phone event information is received at the phone part 304*a* and/or the data provider part 304*b*, a suitable softphone interface such as interface 204 can be generated in the user interface to display phone event information, that is, the phone event itself and any related data. The display and updating of softphone interface 204 can be controlled by the data provider via the web browser 118. Thus, in some embodiments, the data provider part 304*b* of the user interface can change the state of the softphone interface 204 on-demand, that is, responsive to information received from the phone system 108 via phone part 304*a*. In one example, a user's selection, e.g., a mouse click of a displayed selection in the softphone interface 204, is delivered via softphone interface 204 to data provider part 304*b* of the user interface. In this example, data provider part 304*b* sends a message including this selection data to the phone part 304*a*. The web browser 118 can immediately send the user's selection as a phone event back to phone system 108, in this embodiment, without going through a proxy server.

Figure 4:
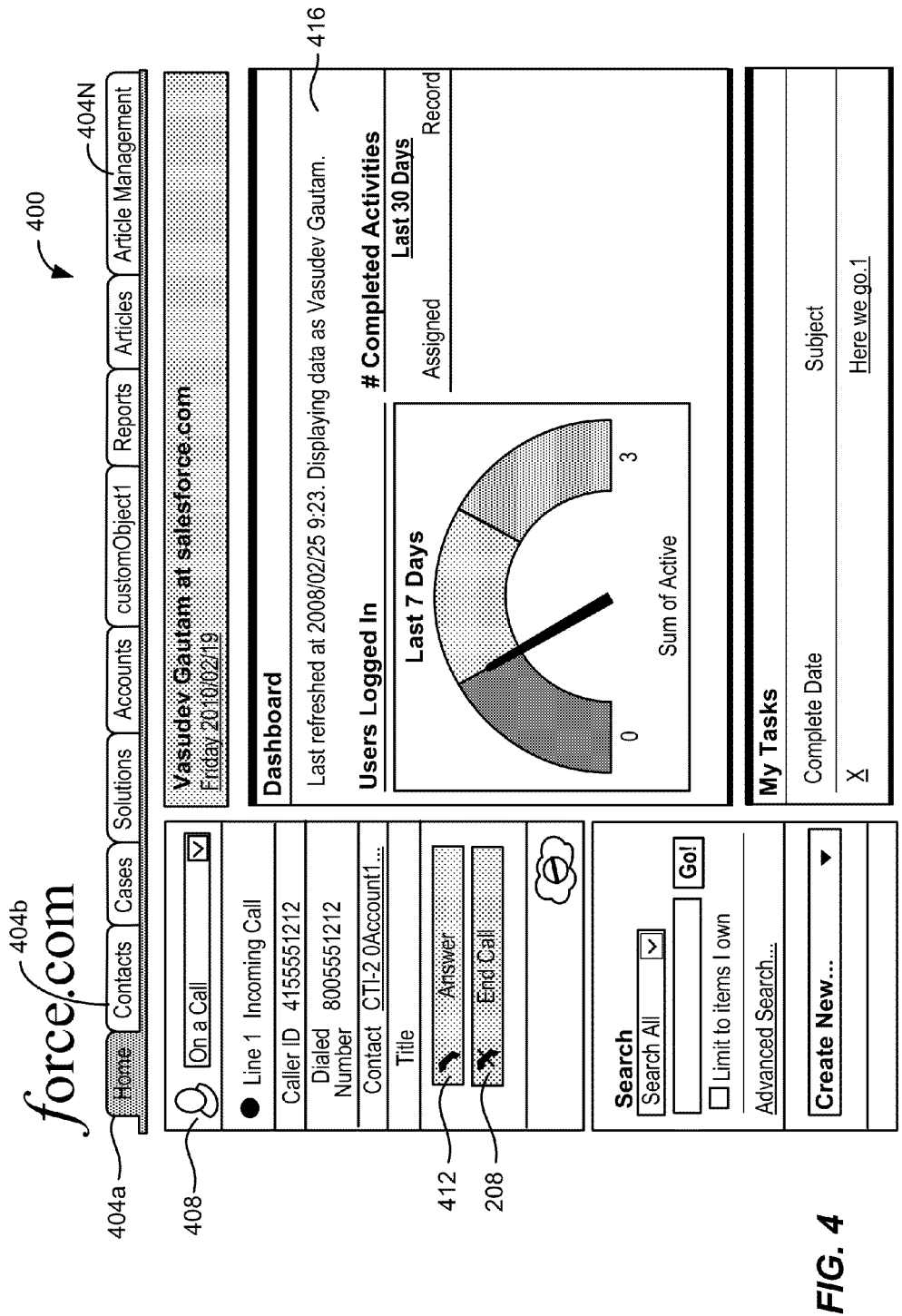
FIG. 4 shows a graphical user interface (GUI) 400 generated on a display device of a client machine in an on-demand service environment, in accordance with one or more embodiments.

FIG. 4 shows a graphical user interface (GUI) 400 generated on a display device of a client machine in an on-demand service environment, in accordance with embodiments described herein. In FIG. 4, a number of tabs 404*a*-404N are provided in the web browser program, allowing a user to select different panes or parts of the user interface 400. In one embodiment, as shown in FIG. 4, when the "Home" tab 404*a* is selected, a softphone interface 408 is displayed in one portion of the user interface. The softphone interface 408 can be generated in response to phone event information including state information delivered by proxy server 104, similar to softphone interface 204 as described with reference to FIG. 2. In the alternative embodiment of FIG. 3, softphone interface 408 can be generated in response to phone event data and related information delivered to the web browser program from the phone system 108.

In FIG. 4, softphone interface 408 displays similar information and selections as softphone interface 204 of FIG. 2. For instance, when the phone event information indicates an incoming call, the user is provided with selections to either answer the call 408, or end the call 208. Here, the phone event information also includes caller ID, dialed number, contact, and title information for the call. Alternatively, some of this data can be retrieved by a data provider part 416 of the interface from an appropriate database 120, using the phone number or other phone event information to access appropriate records. In FIG. 4, data provider part 416 of the user interface is adapted to display retrieved data in various panes. For instance, FIG. 4 shows a home page of the user of the client machine after logging in. This home page could be a supervisor's screen, with historical data indicating total user activity.

When GUI 400 is implemented in the context of system 300, softphone interface 408 shares phone event information with data provider part 416, as described above with reference to FIG. 3. The embodiments described above with respect to FIGS. 1 and 2 can also incorporate the intra-browser messaging described with reference to FIG. 3. Thus, for example, the identity of an incoming call can be shared with data provider part 416 to retrieve a record of data from a multi-tenant database system 120 corresponding to the incoming call.

Figure 5:
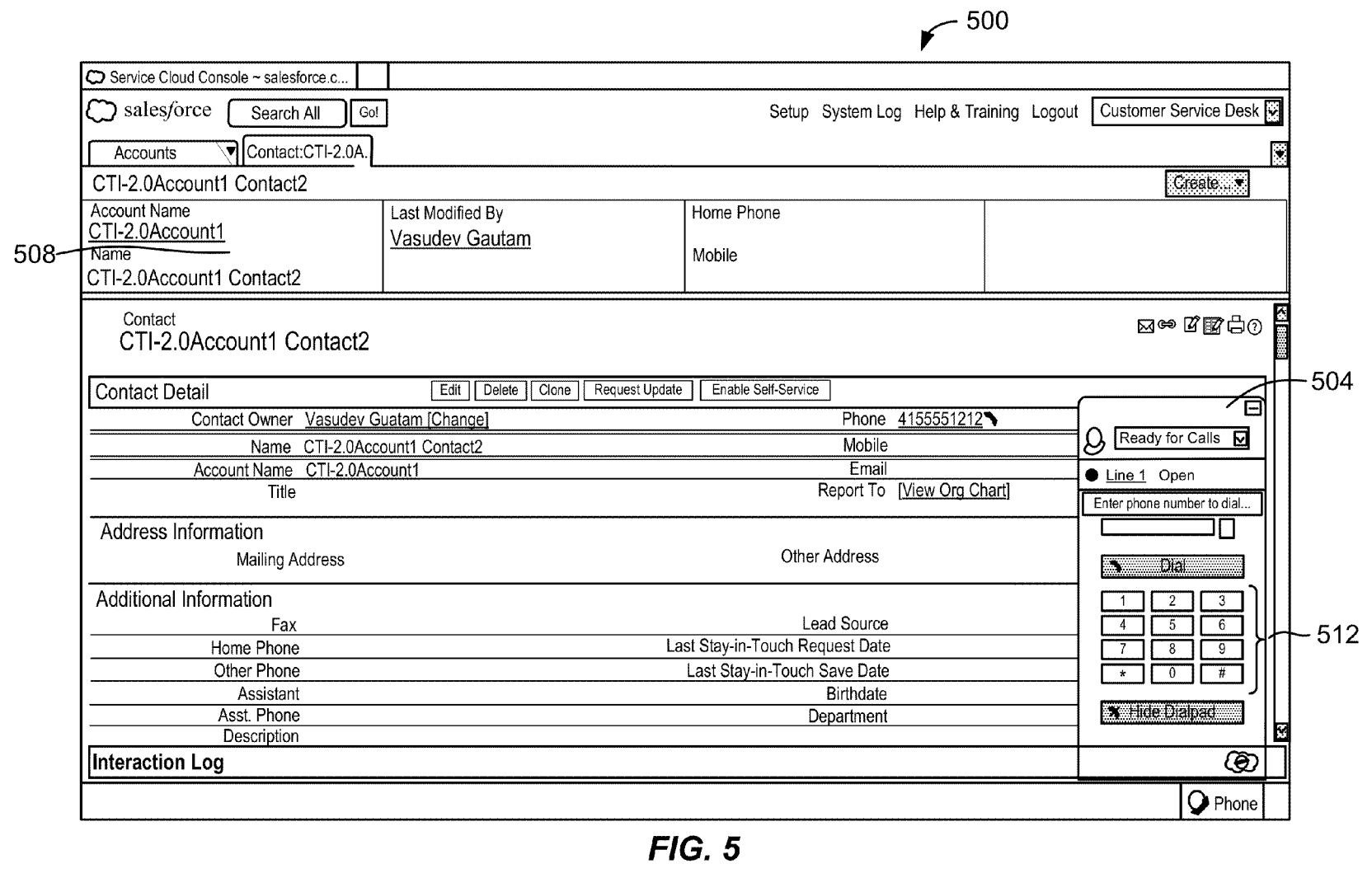

FIG. 5 shows a GUI 500 generated on a display device of a client machine in an on-demand service environment, in accordance with embodiments described herein. In FIG. 5, a softphone interface 504 receives information from phone system 108 directly or via a proxy server 104. This information can be shared with a data provider part 508 of the user interface. The shared information can include phone event information received from the phone system 108, and can also include data entered by a user of the GUI 500. Thus, for example, a telephone number entered by a user who selects soft keys 512 on the softphone interface 504 can be shared with data provider part 508 of the user interface, and used to retrieve a corresponding record from a multi-tenant database 120 managed by the data provider. In the embodiment of FIG. 5, when the user enters a certain customer's phone number on the soft keypad 512, that customer's record can be retrieved and displayed in data provider part 508 of the interface.

Figure 6A:
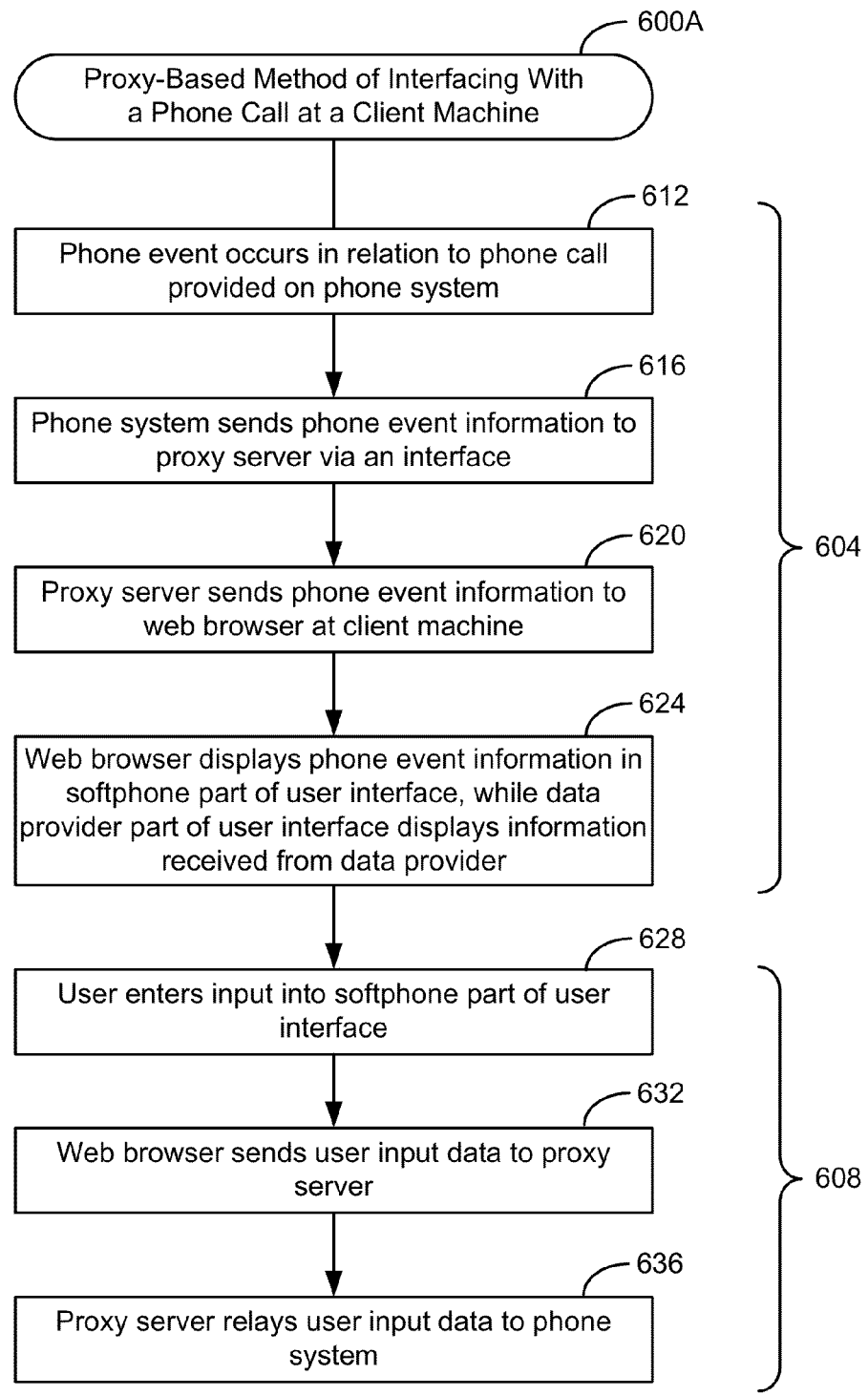
FIG. 6A shows a flow diagram of a method 600A for interfacing with a phone call at a client machine in a proxy-based system, performed in accordance with one or more embodiments.

FIG. 6A shows a flow diagram of a method 600A for interfacing with a phone call at a client machine in a proxy-based system, as illustrated in FIGS. 1 and 2. Method 600A includes two main parts 604 and 608. The operations comprising part 604 relate to the delivery of phone event information from phone system 108 through a proxy server to client machine 112. The operations comprising part 608 relate to the transmission of user inputs, which can constitute phone event information, from client machine 112 to phone system 108. While parts 604 and 608 of method 600A are illustrated in sequence, these parts can be performed as methods independent of one another and in reverse order.

In 612, a phone event occurs in relation to a phone call provided by phone system 108 to telephone 212, in the example of FIG. 2, located proximate to the operator of client machine 112a. For instance, the phone event can be the initiation of that phone call, the transmission of information related to that call such as caller ID, and other events such as the identification of another incoming call on that line. Other examples of phone events include:
 OnConnection
 OnAgentStateChange
 OnCallRinging
 OnCallEnd
 OnDialing
and further events described herein. In 616, phone system 108 sends the phone event information to proxy server 104 in the cloud. In embodiments in which the proxy server is implemented as a plurality of servers 104a and 104b of FIG. 1, such phone event information is transmitted to data provider/API servers 104a. Such data can then be relayed to data provider servers 104b, configured to push the information as described above.

In FIG. 6A, in 620, the proxy server(s) relays the phone event information to web browser 118 at client machine 112a. For example, such phone event information can be transmitted as Comet events 122, as described above. In 624, web browser 118 is capable of receiving the phone event information from the appropriate proxy server or servers and displaying such information in a user interface within browser program 118. The phone event information can be displayed in a designated part or portion of the user interface, as discussed above. In some embodiments, a separate part of the user interface displays other information received from the data provider, such as a record stored in multi-tenant database 120.

In FIG. 6A, part 608 of method 600 begins in 628, in which a user, such as the operator of client machine 112a, enters input into a part of the user interface, such as softphone interface 204, described above. Examples of user input include "verbs," or actions a user takes in relation to interfacing with a phone call, e.g., answering an incoming call, dialing numbers, or hanging up. As used herein, such verbs constitute a subset of phone events and related information. For instance, verbs can include:
 AddButton
 Connect
 Login
 Logout
 CallAlternate
 CallInitiate
 CallRelease
 CallAnswer
 CallHold
 CallRetrieve
 CallSetWrapUpCode
 CallSaveWrapupCode
 CallInitiateTransfer
 CallInitiateConference
 CallOneStepTransfer
 CallOneStepConference
 CallCompleteTransfer
 CallCompleteConference
 ChangeAgentState
 CallAttachData In 632, the web browser program 118 sends the entered user input data to one or more appropriate data provider servers, such as API servers 104a of system 100. In 636, one or more of these proxy servers can then relay the user input data to phone system 108, at which point, phone system 108 can take action in relation to the phone call as is appropriate.

Figure 6B:
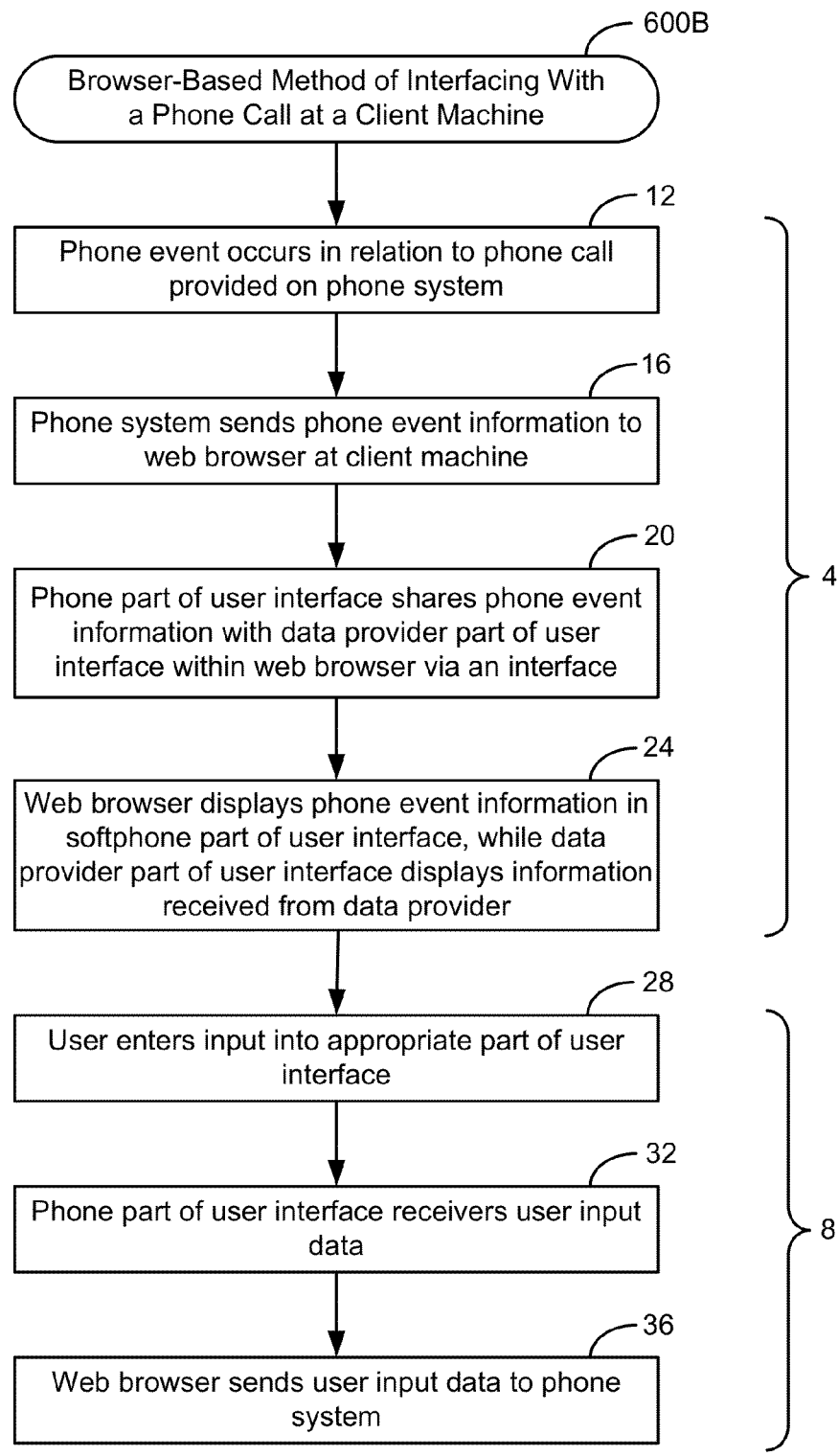
FIG. 6B shows a flow diagram of a method 600B for interfacing with a phone call at a client machine in a browser-based system, performed in accordance with one or more embodiments.

FIG. 6B shows a flow diagram of a method 600B for interfacing with a phone call at a client machine in a browser-based system, as illustrated in FIG. 3. Method 600B includes two main parts 4 and 8. The operations comprising part 4 relate to the sending of phone event information from phone system 108 to client machine 112, and the sharing of information between parts of a user interface on the client machine. The operations comprising part 8 relate to the transmission of user inputs from client machine 112 to phone system 108 through one or more parts of the user interface. While parts 4 and 8 of method 600B are illustrated in sequence, these parts can be performed as methods independent of one another and in reverse order.

In FIG. 6B, a phone event occurs in relation to a phone call provided on phone system 108 in 12. In 16, phone system 108 sends the phone information to web browser 118 located at a client machine. In 20, the phone part of the user interface, such as phone part 304a of FIG. 3, is configured to send messages to the data provider part 304b of the user interface, as described above. Thus, the data provider part can act on such messages as described above. For instance, in 24, the data provider part can be configured to display the received phone event information in a softphone interface, as described above. In 24, regardless of what phone event information is displayed, the data provider part of the interface is configured to display information it receives from data provider 312 in FIG. 3.

In part 8 of method 600B, a user of a client machine enters input data into an appropriate part of the user interface. For instance, data can be entered in an input field in data provider part 304b and relayed as a message to phone part 304a of FIG. 3. In another example, soft keys 512 in softphone interface 504 of GUI 500 can be pressed to enter the input data. Regardless of the particular implementation, generally the phone part of the user interface receives the entered user input data, in 32. In 36, the web browser program 118 sends the received user input data to phone system 108.

To provide security in the various embodiments described above, a white list of trusted domains can be maintained. For instance, in the proxy-based embodiments of FIGS. 1 and 2, a white list of domains can be maintained by the data provider, indicating designated phone systems allowed to communicate with the proxy server. In the browser-based embodiment of FIG. 3, a white list of acceptable domains associated with trusted phone providers can be maintained and checked before enabling the data provider part 304b of the page to receive communications from the phone part 304a of the page within a browser session. If a phone system domain is not identified in the white list, communications are not received by the proxy server or the data provider part of a user interface. In both cases, the white list can be maintained on a server controlled by the data provider in the on-demand service environment.

Figure 7A:
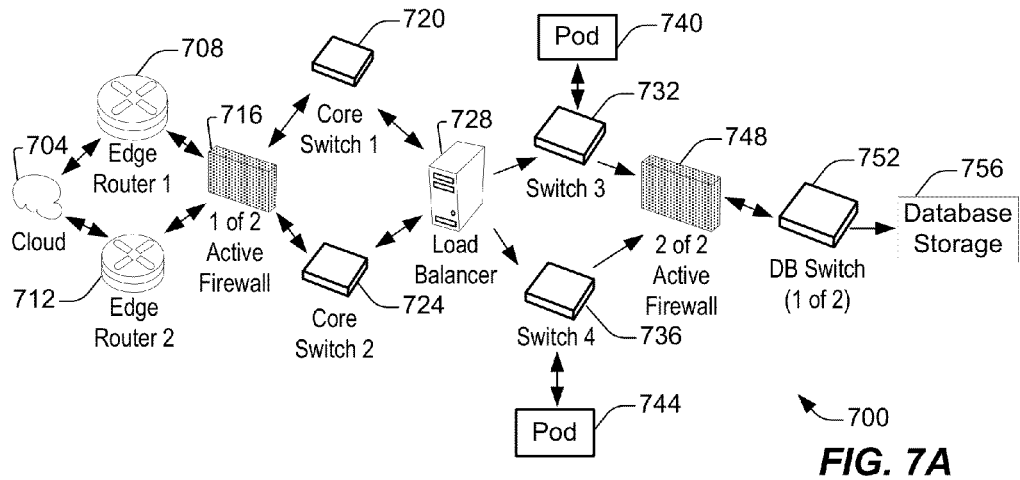
FIG. 7A shows a system diagram 700 illustrating architectural components of an on-demand service environment, in accordance with one embodiment.

FIG. 7A shows a system diagram 700 illustrating architectural components of an on-demand service environment, in accordance with one embodiment.

A client machine located in the cloud 704 (or Internet) may communicate with the on-demand service environment via one or more edge routers 708 and 712. The edge routers may communicate with one or more core switches 720 and 724 via firewall 716. The core switches may communicate with a load balancer 728, which may distribute server load over different pods, such as the pods 740 and 744. The pods 740 and 744, which may each include one or more servers and/or other computing resources, may perform data processing and other operations used to provide on-demand services. Communication with the pods may be conducted via pod switches 732 and 736. Components of the on-demand service environment may communicate with a database storage system 756 via a database firewall 748 and a database switch 752.

Figure 7B:
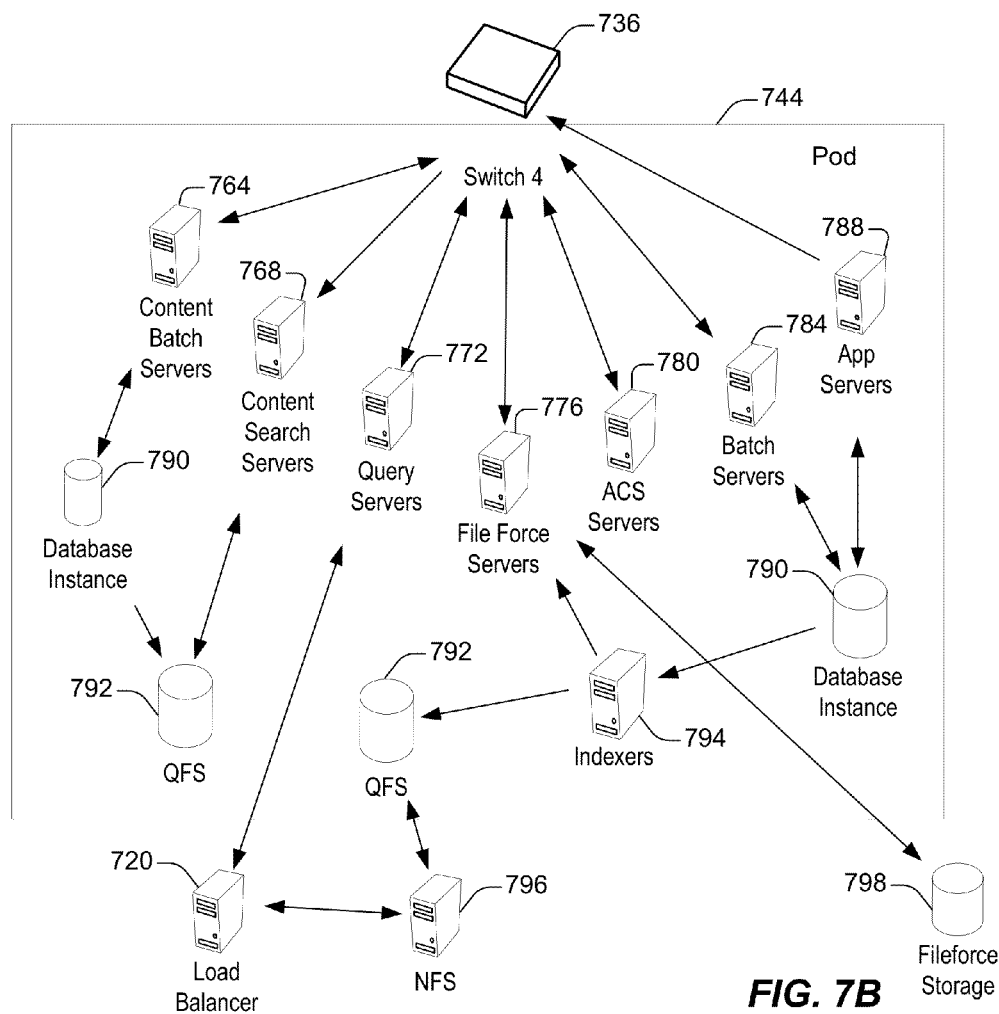
FIG. 7B shows a system diagram further illustrating architectural components of an on-demand service environment, in accordance with one embodiment.

As shown in FIGS. 7A and 7B, accessing an on-demand service environment may involve communications transmitted among a variety of different hardware and/or software components. Further, the on-demand service environment 700 is a simplified representation of an actual on-demand service environment. For example, while only one or two devices of each type are shown in FIGS. 7A and 7B, some embodiments of an on-demand service environment may include anywhere from one to many devices of each type. Also, the on-demand service environment need not include each device shown in FIGS. 7A and 7B, or may include additional devices not shown in FIGS. 7A and 7B. Moreover, one or more of the devices in the on-demand service environment 700 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 704 is intended to refer to a data network or plurality of data networks, often including the Internet. Client machines located in the cloud 704 may communicate with the on-demand service environment to access services provided by the on-demand service environment. For example, client machines may access the on-demand service environment to retrieve, store, edit, and/or process information.

In some embodiments, the edge routers 708 and 712 route packets between the cloud 704 and other components of the on-demand service environment 700. The edge routers 708 and 712 may employ the Border Gateway Protocol (BGP). The BGP is the core routing protocol of the Internet. The edge routers 708 and 712 may maintain a table of IP networks or 'prefixes' which designate network reachability among autonomous systems on the Internet.

In one or more embodiments, the firewall 716 may protect the inner components of the on-demand service environment 700 from Internet traffic. The firewall 716 may block, permit, or deny access to the inner components of the on-demand service environment 700 based upon a set of rules and other criteria. The firewall 716 may act as one or more of a packet filter, an application gateway, a stateful filter, a proxy server, or any other type of firewall.

In some embodiments, the core switches 720 and 724 are high-capacity switches that transfer packets within the on-demand service environment 700. The core switches 720 and 724 may be configured as network bridges that quickly route data between different components within the on-demand service environment. In some embodiments, the use of two or more core switches 720 and 724 may provide redundancy and/or reduced latency.

In some embodiments, the pods 740 and 744 may perform the core data processing and service functions provided by the on-demand service environment. Each pod may include various types of hardware and/or software computing resources. An example of the pod architecture is discussed in greater detail with reference to FIG. 7B.

In some embodiments, communication between the pods 740 and 744 may be conducted via the pod switches 732 and 736. The pod switches 732 and 736 may facilitate communication between the pods 740 and 744 and client machines located in the cloud 704, for example via core switches 720 and 724. Also, the pod switches 732 and 736 may facilitate communication between the pods 740 and 744 and the database storage 756.

In some embodiments, the load balancer 728 may distribute workload between the pods 740 and 744. Balancing the on-demand service requests between the pods may assist in improving the use of resources, increasing throughput, reducing response times, and/or reducing overhead. The load balancer 728 may include multilayer switches to analyze and forward traffic.

In some embodiments, access to the database storage 756 may be guarded by a database firewall 748. The database firewall 748 may act as a computer application firewall operating at the database application layer of a protocol stack. The database firewall 748 may protect the database storage 756 from application attacks such as structure query language (SQL) injection, database rootkits, and unauthorized information disclosure.

In some embodiments, the database firewall 748 may include a host using one or more forms of reverse proxy services to proxy traffic before passing it to a gateway router. The database firewall 748 may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some embodiments, communication with the database storage system 756 may be conducted via the database switch 752. The multi-tenant database system 756 may include more than one hardware and/or software components for handling database queries. Accordingly, the database switch 752 may direct database queries transmitted by other components of the on-demand service environment (e.g., the pods 740 and 744) to the correct components within the database storage system 756.

In some embodiments, the database storage system 756 is an on-demand database system shared by many different organizations. The on-demand database system may employ a multi-tenant approach, a virtualized approach, or any other type of database approach. An on-demand database system is discussed in greater detail with reference to FIGS. 8 and 9.

FIG. 7B shows a system diagram illustrating the architecture of the pod 744, in accordance with one embodiment. The pod 744 may be used to render services to a user of the on-demand service environment 700.

In some embodiments, each pod may include a variety of servers and/or other systems. The pod 744 includes one or more content batch servers 764, content search servers 768, query servers 772, file force servers 776, access control system (ACS) servers 780, batch servers 784, and app servers 788. Also, the pod 744 includes database instances 790, quick file systems (QFS) 792, and indexers 794. In one or more embodiments, some or all communication between the servers in the pod 744 may be transmitted via the switch 736.

In some embodiments, the application servers 788 may include a hardware and/or software framework dedicated to the execution of procedures (e.g., programs, routines, scripts) for supporting the construction of applications provided by the on-demand service environment 700 via the pod 744. Some such procedures may include operations for providing the services described herein.

The content batch servers 764 may requests internal to the pod. These requests may be long-running and/or not tied to a particular customer. For example, the content batch servers 764 may handle requests related to log mining, cleanup work, and maintenance tasks.

The content search servers 768 may provide query and indexer functions. For example, the functions provided by the content search servers 768 may allow users to search through content stored in the on-demand service environment.

The Fileforce servers 776 may manage requests information stored in the Fileforce storage 778. The Fileforce storage 778 may store information such as documents, images, and basic large objects (BLOBs). By managing requests for information using the Fileforce servers 776, the image footprint on the database may be reduced.

The query servers 772 may be used to retrieve information from one or more file systems. For example, the query system 772 may receive requests for information from the app servers 788 and then transmit information queries to the NFS 796 located outside the pod.

The pod 744 may share a database instance 790 configured as a multi-tenant environment in which different organizations share access to the same database. Additionally, services rendered by the pod 744 may require various hardware and/or software resources. In some embodiments, the ACS servers 780 may control access to data, hardware resources, or software resources.

In some embodiments, the batch servers 784 may process batch jobs, which are used to run tasks at specified times. Thus, the batch servers 784 may transmit instructions to other servers, such as the app servers 788, to trigger the batch jobs.

In some embodiments, the QFS 792 may be an open source file system available from Sun Microsystems® of Santa Clara, Calif. The QFS may serve as a rapid-access file system for storing and accessing information available within the pod 744. The QFS 792 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 768 and/or indexers 794 to identify, retrieve, move, and/or update data stored in the network file systems 796 and/or other storage systems.

In some embodiments, one or more query servers 772 may communicate with the NFS 796 to retrieve and/or update information stored outside of the pod 744. The NFS 796 may allow servers located in the pod 744 to access information to access files over a network in a manner similar to how local storage is accessed.

In some embodiments, queries from the query servers 722 may be transmitted to the NFS 796 via the load balancer 720, which may distribute resource requests over various resources available in the on-demand service environment. The NFS 796 may also communicate with the QFS 792 to update the information stored on the NFS 796 and/or to provide information to the QFS 792 for use by servers located within the pod 744.

In some embodiments, the pod may include one or more database instances 790. The database instance 790 may transmit information to the QFS 792. When information is transmitted to the QFS, it may be available for use by servers within the pod 744 without requiring an additional database call.

In some embodiments, database information may be transmitted to the indexer 794. Indexer 794 may provide an index of information available in the database 790 and/or QFS 792. The index information may be provided to file force servers 776 and/or the QFS 792.

Figure 8:
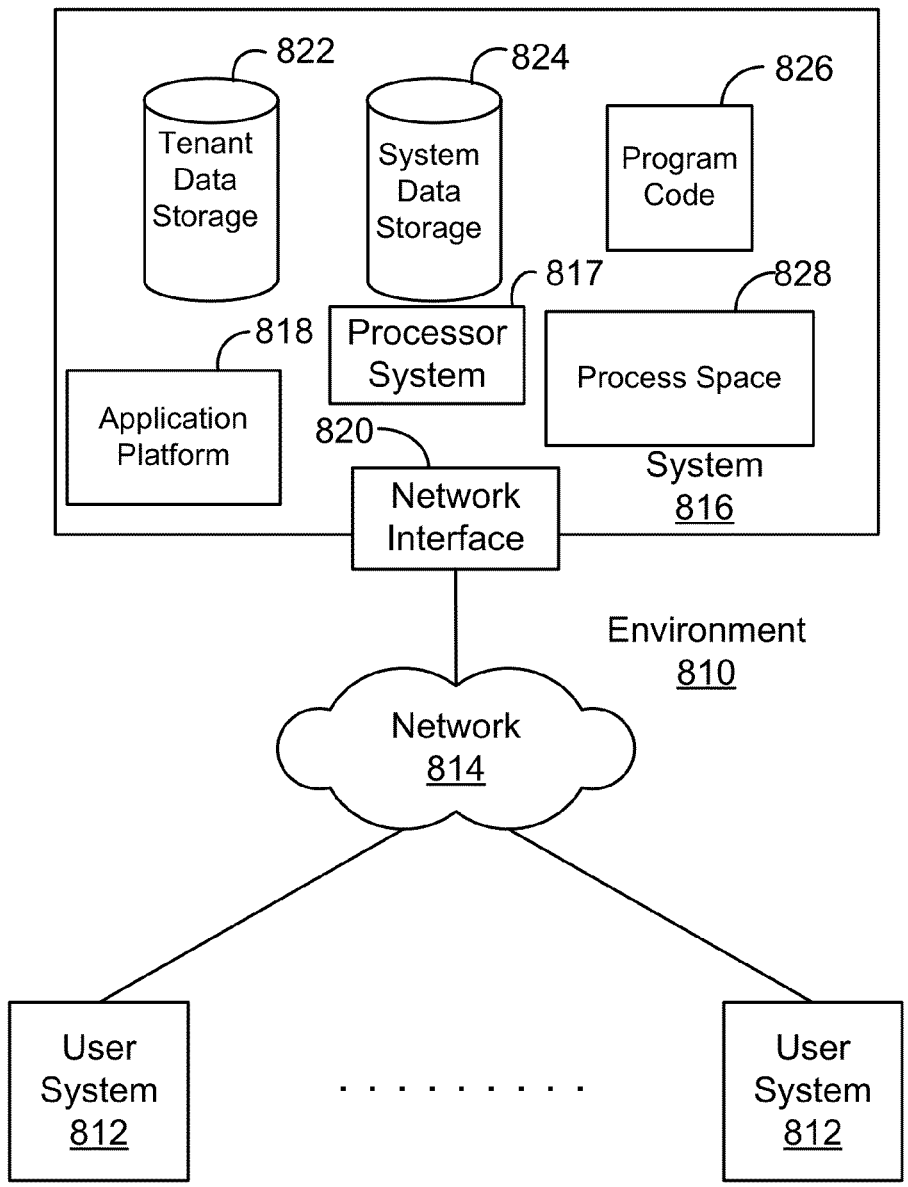
FIG. 8 shows a system diagram 810 illustrating the architecture of a multi-tenant database environment, in accordance with one embodiment.

FIG. 8 shows a block diagram of an environment 810 wherein an on-demand database service might be used, in accordance with one embodiment.

Figure 9:
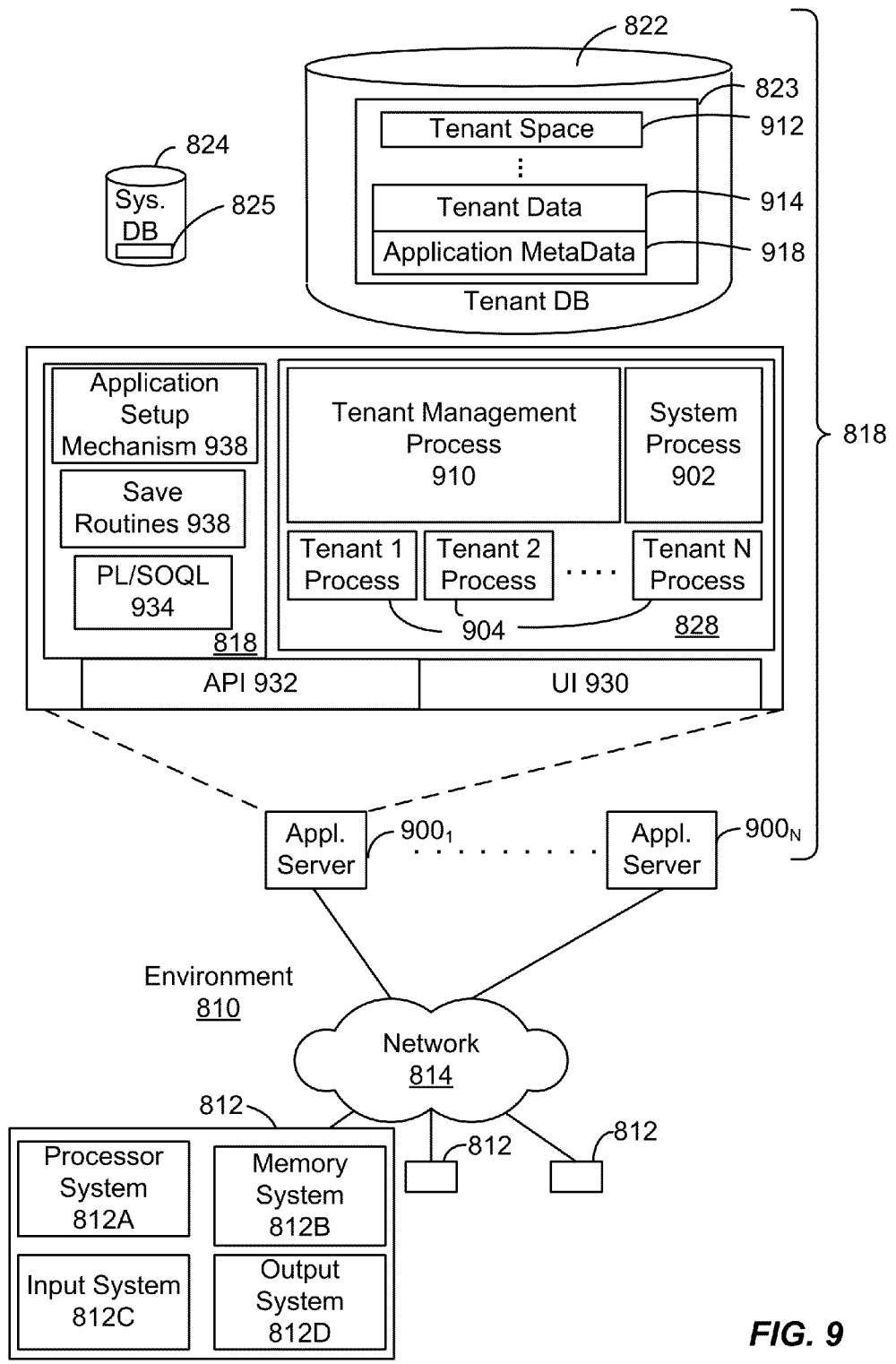
FIG. 9 shows a system diagram 810 further illustrating the architecture of a multi-tenant database environment, in accordance with one embodiment.

Environment 810 includes an on-demand database service 816. User system 812 may be any machine or system that is used by a user to access a database user system. For example, any of user systems 812 can be a handheld computing device, a mobile phone, a laptop computer, a work station, and/or a network of computing devices. As illustrated in FIGS. 8 and 9, user systems 812 might interact via a network 814 with the on-demand database service 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDBMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

The users of user systems 812 may differ in their respective capacities, and the capacity of a particular user system 812 might be entirely determined by permissions (permission levels) for the current user. For example, where a call center agent is using a particular user system 812 to interact with system 816, the user system 812 has the capacities allotted to that call center agent. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks that can be used are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system such as the service cloud console described in commonly assigned and co-pending U.S. patent application Ser. No. 12/878,884, titled SERVICE CLOUD CONSOLE, by Casalaina et al., filed herewith, which is hereby incorporated by reference in its entirety and for all purposes. For example, in one embodiment, system 816 includes application servers configured to implement and execute CRM software applications as well as provide related data, code, forms, web pages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications. User (or third party developer) applications, which may or may not include CRM, may be supported by the application platform 818, which manages creation, storage of the applications into one or more database objects and executing of the applications in a virtual machine in the process space of the system 816.

Each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814.

Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 816 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing the disclosed embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also shows a block diagram of environment 810 further illustrating system 816 and various interconnections, in accordance with one embodiment. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers 9001-900N, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of processors. Memory system 812B may be any combination of one or more memory devices, short term, and/or long term memory. Input system 812C may be any combination of input devices, such as keyboards, mice, trackballs, scanners, cameras, and/or interfaces to networks. Output system 812D may be any combination of output devices, such as monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as Oracle™ databases.

Application platform 818 includes an application setup mechanism 938 that supports application developers' creation and management of applications, which may be saved as metadata into tenant data storage 822 by save routines 936 for execution by subscribers as tenant process spaces 904 managed by tenant management process 910 for example. Invocations to such applications may be coded using PL/SOQL 34 that provides a programming language style interface extension to API 932. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server 9001 might be coupled via the network 814 (e.g., the Internet), another application server 900N-1 might be coupled via a direct network link, and another application server 900N might be coupled by yet a different network connection. Transfer Control Protocol and Internet Protocol (TCP/IP) are typical protocols for communicating between application servers 900 and the database system. However, other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each call center agent uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client machines/systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

The embodiments disclosed herein may include a cross-domain API situated at a client machine that allows pages served from external domains to perform certain actions, such as exchanging information with one another, within a web browser program running on the client machine. These pages may be referred to as "third party pages." FIGS. 10A and 10B show flow diagrams illustrating interactions of third party pages, in accordance with one or more embodiments.

Because communication between frames from different domains presents a security risk within the browsers, this functionality is explicitly restricted in some modern browsers. In other modern browsers, however, cross-domain communication is enabled, for instance, in HTML 5 (available from W3.org at http://www.w3.org/TR/html5/comms.html) with the postMessage framework. However, HTML 5 is currently supported in only a limited number of browsers, such as Internet Explorer 8, Firefox 3, and Opera 9.

In some embodiments, the cross-domain API may be used to facilitate integration with third party pages within salesforce.com® itself. Given the potential security concerns, it may be desirable to avoid exposing the ability for a third-party domain to directly perform data manipulation. For example, in salesforce.com® it may be possible to open an edit page, make modifications to an object, and save it, all by opening a single URL with a set of parameters in the query string. However, this type of operation may not be permitted by the cross-domain API, as it could open up a means for attackers to modify data without the user's knowledge or consent.

Figure 10A:
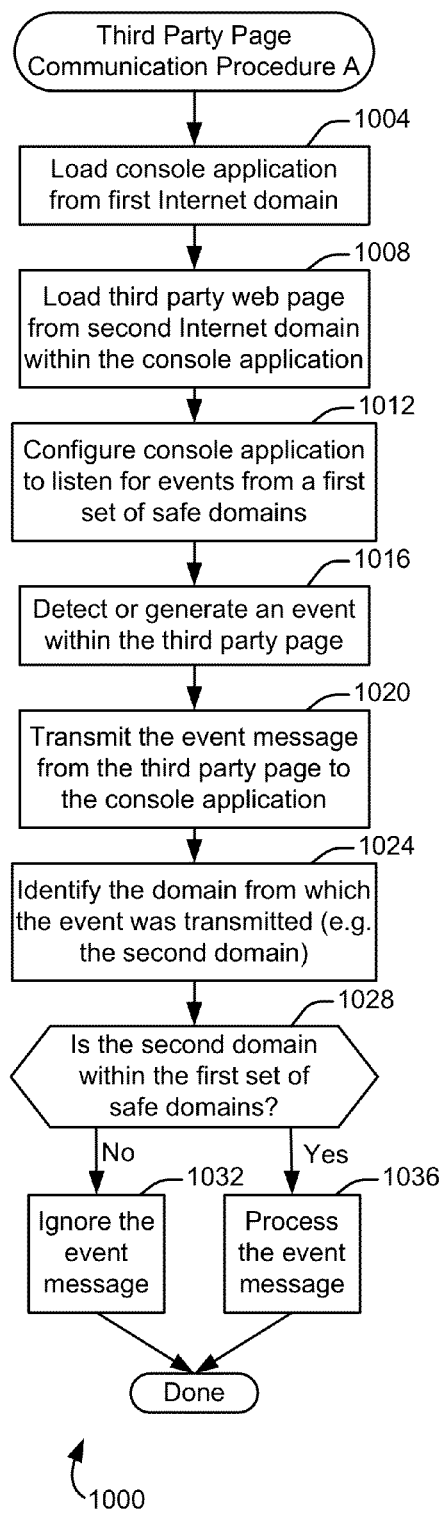
FIGS. 10A and 10B show flow diagrams illustrating interactions of pages within a web browser program, in accordance with one or more embodiments.
Figure 10B:
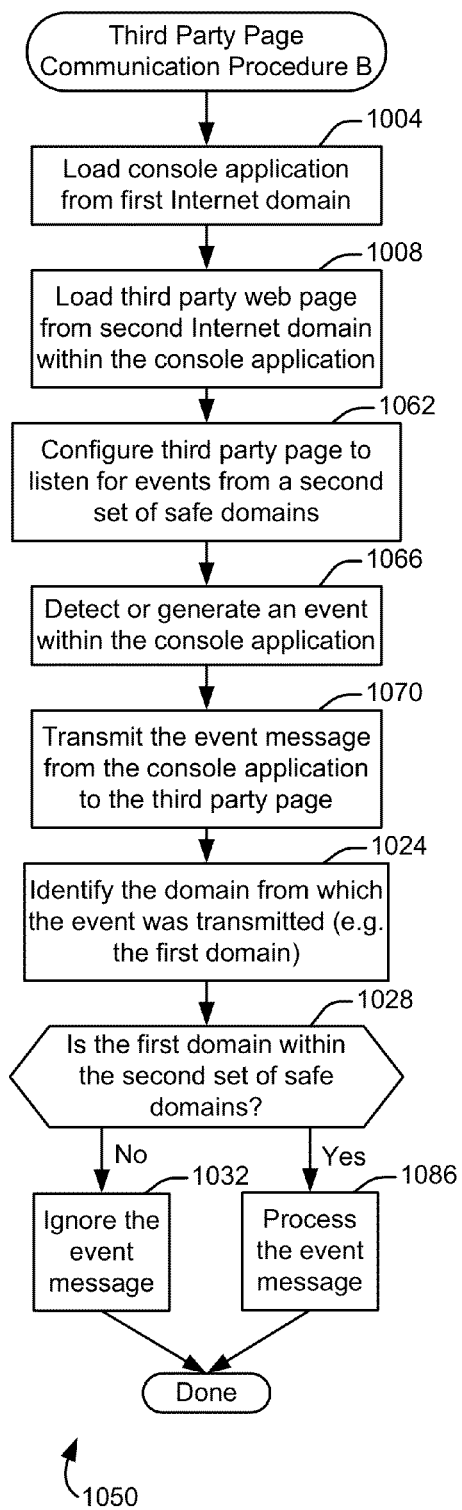

The third party page communication methods shown in FIGS. 10A and 10B may be used to facilitate secure cross-domain communication. These methods may be run in a web browser at a client machine in communication with one or more servers that provide data to the browser. However, some or all of the individual processing steps shown in FIGS. 10A and 10B may be performed without communication with the server. Thus, cross-domain communications may be facilitated without requiring the additional latency or computational burdens that would exist if cross-domain communications were accomplished using a proxy or other type of server communication.

In one embodiment, in 1004, a service cloud console application from the data provider is loaded from a first domain, such as www.salesforce.com. The console application may be loaded by sending instructions from one or more data provider servers 312 hosting the first domain, as shown in FIG. 3, to a web browser at a client machine. When the console application is loaded, records served from the first domain may be visible in the console application.

In 1008, a third party web page is loaded from a second domain, for instance, from phone system 108, in a portion of a user interface also displaying the console application. In some embodiments, the third party web page may be loaded as a primary or secondary tab within the console application. The third party web page may also be automatically loaded in response to receiving data from the phone system 108.

In some embodiments, the first domain is controlled by a data provider, e.g., salesforce.com®, while the second domain may be controlled by a different entity, such as the phone provider. For example, the console application may be loaded from a first domain controlled by salesforce.com®, while the third party page is loaded from a second domain controlled by a phone provider unaffiliated with the service provider controlling the first domain.

In 1012, the console application is configured to listen to events from a first set of safe domains. The first set of safe domains identifies the one or more trusted domains from which the console application may safely accept cross-domain messages. In some embodiments, the first set of safe domains may be limited to a particular group of domains, such as those provided by the data provider of the console application. The first set of safe domains may also include domains identified as trusted, such as the second domain associated with the phone provider/phone system 108.

In some embodiments, wildcards may be used to identify groups of domains using a single string. For example, the first set of safe domains may include domains such as na1.force.com, *.na2.force.com, and/or *.salesforce.com.

In 1016, the third party page may detect an event of some type, such as the receipt of phone event information from some source, as described above. The detected event may include any type of occurrence that causes cross-domain communication. In some embodiments, the event may be a scripting event triggered directly by a user action, such as clicking a link or button within the third party page. Alternately, or additionally, the event may be generated by code running within the third party page that identifies a triggering condition.

In 1020, the event triggers a message that is sent to the console application. The message may include a JavaScript® event message, or other type of event message. The message may be sent to a JavaScript® Event Listener operating in the console application served from the first domain. Alternately, or additionally, a different type of scripting language may be used, such as VBScript.

When the event message is received, the console application identifies the domain from which the event message was sent (i.e. the second domain), as shown at 1024. The domain may be identified by retrieving a value associated with the event message. After the second domain is identified as the source of the event, the second domain is compared to the first set of safe domains, as shown at 1028.

As shown at 1032, if the second domain is not within the first set of safe domains, then the message is ignored. In this case, the second domain has not been identified as a "safe" domain from which to receive messages. By only accepting messages sent from an identified subset of domains, the security risks inherent in cross-domain communications may be mitigated.

In some embodiments, receiving a cross-domain event message from a third party domain not in the first set of safe domains may cause one or more security or logging actions to be taken. For example, the event message may be logged in a security record to help identify unauthorized attempts to access the service cloud console application.

As shown at 1036, the event message is processed if the second domain is within the first set of safe domains. The event message may be processed according to one or more event handlers in the console application.

In some embodiments, even domains included in the first set of safe domains may be limited to triggering particular actions or types of actions within the console application, in order to provide further protection against unauthorized access. Examples of such actions are discussed below. However, different embodiments may allow various actions or types of actions in response to an event message.

Regardless of whether the event message is processed, the service cloud console may continue monitoring for additional messages transmitted from third party domains. Continual monitoring for cross-domain event messages may be accomplished using, for example, an Observer design pattern. Thus, the third party page may be able to send messages to the service cloud console, while the security of the console application is maintained.

FIG. 10B shows a complementary third party page communication method B for transmitting messages from the console application to a third party page. The method shown in FIG. 10B is similar to the method shown in FIG. 10A in some respects, with like reference numerals indicating like operations.

In some embodiments, a different set of safe domains may be identified at 1062 than at 1012. For example, the second set of safe domains may be limited to domains associated with the service cloud console (e.g., *.force.com, *.salesforce.com), while the first set of safe domains may include one or more domains associated with third party service providers. By using different sets of safe domains, the security of the third party pages may be maintained because the third party pages may not be operable to communicate with each other.

In 1066, an event within the console application is detected, similar to 1016. In 1070, an event message from the console application is communicated to the third party page, similar to 1020. In some embodiments, a different set of actions or types of actions may be allowed in response to receiving an event message from an accepted domain, as shown at 1086. In both FIGS. 10A and 10B, the set of allowable actions or types of actions may be strategically determined based on security concerns and the type of cross-domain communication that is needed to facilitate integration.

In some embodiments, the methods shown in FIGS. 10A and 10B may be performed concurrently, thus allowing for secure cross-domain two-way communication between the console application and the third party page. Alternately, one of the methods shown in FIGS. 10A and 10B may be omitted so that only one-way cross-domain communication is allowed.

The cross-domain API is described with reference to a pseudocode implementation according to some embodiments. However, the pseudocode is provided only as an example, and some embodiments may employ a different implementation. For example, cross-domain API methods may be specified using methods, method names, parameters, and/or parameter names (e.g., method(parameter1:type, parameter2:type):returntype). However, different methods, method names, parameters, and/or parameters names may be used in different embodiments. As another example, at least part of the cross-domain API pseudocode here may appear as methods that return values synchronously. However, some embodiments may include one or more methods that return values asynchronously (e.g., via a callback method).

Developers may be able to import one or more libraries into various pages, but some methods within these libraries may be prevented from operating unless the pages are run in a designated context.

Third party pages may have the ability to open primary tabs, subtabs, or both. Primary tabs and subtabs opened from third party pages may follow navigation rules similar to standard pages. For example, duplicate pages may not be allowed by default. However, developers may be permitted to allow duplicate pages. As another example, third party pages may behave with back, forward, and/or refresh buttons in a manner similar to standard pages.

In some embodiments, more than one technique may be used to facilitate cross-domain communication between HTML iframes. Accordingly, some embodiments may include JavaScript® libraries that abstract the handling of event passing between cross-domain HTML iframes. The code may determine whether to use the cross-domain scripting API, the postMessage method provided by HTML 5, the hidden HTML iframe method based on the browser, or any other method. Events that are fired within the console may be captured and re-fired to cross-domain HTML iframes and/or vice versa using one of these methods.

Some embodiments may include a server push framework, such as the VOMET technology developed by salesforce.com®, for providing cross-domain communication between frames. Events from the browser may be passed to VOMET software on a server, which would then push the events directly to the cross-domain frames.

Some embodiments may include a hash (or HTML anchor) technique for providing cross-domain communication between frames. The hash technique relies on two browser behaviors: 1) the location of a window can be modified cross-domain, and 2) the page is not reloaded when only the anchor is modified. The hash technique may require the particular window or frame to poll for changes to the URL.

Some embodiments may include a hidden HTML iframe technique for providing cross-domain communication between frames. Using the hidden HTML iframe technique, messages may be passed through the hash as with the hash technique. In contrast to the hash technique, however, the messages are passed to a hidden HTML iframe that points to a proxy page within the same domain as the target frame. Since the hidden HTML iframe and the target HTML iframe are in the same domain, they can safely communicate with each other. Because code is placed on the target domain when using the hidden HTML iframe technique, this technique does not break browser security. However, the developer may need access to both domains. Using the hidden HTML iframe technique, events can be pushed instead of pulled to the target frame by taking advantage of the iframe resize event. Since messages only change the URL of the hidden HTML iframe, they do not modify the parent window URL. In some embodiments, the communication iframe may only be created on an as-needed basis, which may result in improved performance.

Some embodiments may incorporate various technologies for constructing pages. For example, one or more components or pages may be constructed using Lumen, Ext, ExtJS, Flex, and/or VisualForce™ technologies available from Salesforce.com®. As another example, one or more components or pages may be constructed using Flash, Ajax, HTML, JavaScript®, or other publicly available technologies.

In some embodiments, one or more technologies developed by Salesforce.com®, such as the Web Services API, VisualForce™, and/or Apex Service-oriented Architecture ("SOA") may be used to display and/or integrate disparate data sources from across multiple systems. The apparatus and methods described herein may be designed or configured for use with various web browsers, such as IE 7+, Firefox 3.5+, Safari, etc.

In some embodiments, performance may be improved by optimizing pages for high performance in a browser environment. Some web analytics and/or on-line business optimization platforms such as Omniture® may be used to measure the performance and adjust it as needed. In some embodiments, a network operations center ("NOC") may be used to monitor performance and react quickly to performance degradation.

Ext is a JavaScript® platform developed by Salesforce.com® that includes a broad variety of UI components that can be used to develop highly interactive browser UIs. Ext may allow a complex layout. It also has a well-defined event model which facilitates component communication. JavaScript components may be created by subclassing Ext's components.

In some embodiments, some or all of the content viewable through the service cloud console will be inside of HTML iframes. The content included inside HTML iframes may include, but is not limited to: detail/edit pages, enhanced list views, customer and Salesforce®-created VisualForce™ pages and any random sites that customers put into custom links. HTML iframes may be useful because putting content of multiple detail/edit pages on the same browser page. Without iframes, for example, there may be conflicting ids and/or broken JavaScript®.

In some embodiments, the client machine may communicate with a server via Ajax. The workspace context panel may display a layout-driven grid of fields from the detail page to the user. The HTML for these fields may differ from that in the Detail page because, for example, some complex elements (e.g., lookup) may have specific HTML IDs and output JavaScript® that references those HTML IDs. In order to reconstruct those elements and reassign HTML IDs to redisplay them, the workspace context panel may request the HTML for its fields from a servlet that resolves the HTML ID and JavaScript® issues.

It should be noted that some of the embodiments described herein may be equipped with one or more of the features set forth in the following published applications: US2003/0233404, US2004/0210909, US2005/023022, US2005/0283478, US2006/0206834, and/or US2005/0065925, all of which are hereby incorporated by reference in their entirety and for all purposes.

While the present embodiments are described with reference to an on-demand service environment capable of supporting multiple tenants, these embodiments are not limited to multi-tenant databases or deployment on application servers. Embodiments may be practiced using other database architectures, for instance, ORACLE®, DB2® by IBM, and the like without departing from the scope of the embodiments claimed.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method for interfacing with a phone system in an on-demand service environment, performed at a client machine in communication with a data provider and the phone system, the method comprising:
receiving, at the client machine, a message from the phone system including information regarding a phone event in relation to a phone call, the phone system providing the phone call and operated by a phone provider separate from the data provider;
providing the phone event information in a first part of a user interface in a web browser on the client machine;
receiving record information from the data provider at the client machine;
providing the record information in a second part of the user interface; and
communicating a message from the first part of the user interface including the phone event information to the second part of the user interface to update the second part or a third part of the user interface.

2. The method of claim 1, the web browser capable of displaying the phone event information responsive to the second part of the user interface receiving the message from the first part of the user interface.

3. The method of claim 1, the web browser capable of causing the phone event information to be displayed in a third part of the user interface.

4. The method of claim 1 further comprising:
receiving, at the web browser of the client machine, input data from an input device.

5. The method of claim 4, the input data associated with a selection displayed in the web browser, the selection associated with the phone call.

6. The method of claim 4 further comprising:
sending the input data from the first part of the user interface of the web browser to the phone system.

7. The method of claim 4 further comprising:
sending a message including the input data from the second part of the user interface to the first part of the user interface.

8. The method of claim 1, the phone system having a first network domain, and the data provider having a second network domain.

9. The method of claim 1, the first part of the user interface and the second part of the user interface in communication with one another via an application programming interface (API).

10. The method of claim 9, the API being a cross-domain API.

11. The method of claim 10, a library associated with the web browser capable of calling the API.

12. The method of claim 1, the second part of the user interface subscribing to messages from the first part of the user interface.

13. The method of claim 1, the first part of the user interface subscribing to messages from the second part of the user interface.

14. A data processing apparatus for interfacing with a phone system in an on-demand service environment, the data processing apparatus in communication with a data provider and the phone system, the apparatus comprising:
a processor; and
one or more stored instructions which, when executed by the processor, enable the processor to:
receive a message from the phone system including information regarding a phone event in relation to a phone call, the phone system providing the phone call and operated by a phone provider separate from the data provider;
provide the phone event information in a first part of a user interface in a web browser;
receive information from the data provider;
provide the information in a second part of the user interface; and
communicate a message from the first part of the user interface including the phone event information to the second part of the user interface to update the second part or a third part of the user interface.

15. The data processing apparatus of claim 14, the web browser capable of displaying the phone event information responsive to the second part of the user interface receiving the message from the first part of the user interface.

16. The data processing apparatus of claim 14, the web browser capable of causing the phone event information to be displayed in a third part of the user interface.

17. The data processing apparatus of claim 14, the processor further enabled to:
receive input data from an input device.

18. The data processing apparatus of claim 17, the input data associated with a selection displayed in the web browser, the selection associated with the phone call.

19. The data processing apparatus of claim 17, the processor further enabled to:
send the input data from the first part of the user interface of the web browser to the phone system.

20. The data processing apparatus of claim 17, the processor further enabled to:
send a message including the input data from the second part of the user interface to the first part of the user interface.

21. The data processing apparatus of claim 14, the first part of the user interface and the second part of the user interface in communication with one another via an application programming interface (API).

22. The data processing apparatus of claim 21, the API being a cross-domain API.

23. The data processing apparatus of claim 22, a library associated with the web browser capable of calling the API.

24. The data processing apparatus of claim 14, the second part of the user interface subscribing to messages from the first part of the user interface.

25. The data processing apparatus of claim 14, the first part of the user interface subscribing to messages from the second part of the user interface.

26. One or more tangible non-transitory computer-readable medium having instructions stored thereon for interfacing with a phone system in an on-demand service environment, performed at a client machine in communication with a data provider and the phone system, the instructions executable by a processor to enable the client machine to:
receive a message from the phone system including information regarding a phone event in relation to a phone call, the phone system providing the phone call and operated by a phone provider separate from the data provider;
provide the phone event information in a first part of a user interface in a web browser;
receive record information from the data provider;
provide the record information in a second part of the user interface; and communicate a message from the first part of the user interface including the phone event information to the second part of the user interface to update the second part or a third part of the user interface.

27. The tangible non-transitory computer-readable medium of claim 26, the web browser capable of displaying the phone event information responsive to the second part of the user interface receiving the message from the first part of the user interface.

28. The tangible non-transitory computer-readable medium of claim 26, the web browser capable of causing the phone event information to be displayed in a third part of the user interface.

29. The tangible non-transitory computer-readable medium of claim 26, the first part of the user interface and the second part of the user interface in communication with one another via an application programming interface (API).

30. The tangible non-transitory computer-readable medium of claim 29, the API being a cross-domain API.

31. The tangible non-transitory computer-readable medium of claim 30, a library associated with the web browser capable of calling the API.

32. The tangible non-transitory computer-readable medium of claim 26, the second part of the user interface subscribing to messages from the first part of the user interface.

33. The tangible non-transitory computer-readable medium of claim 26, the first part of the user interface subscribing to messages from the second part of the user interface.

* * * * *